(12) United States Patent
Onogi

(10) Patent No.: US 6,304,805 B1
(45) Date of Patent: Oct. 16, 2001

(54) VEHICLE BEHAVIOR ESTIMATING AND CONTROLLING METHOD AND SYSTEM AS WELL AS BODY SLIP ANGLE ESTIMATING METHOD AND SYSTEM

(75) Inventor: Nobuyoshi Onogi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/620,568

(22) Filed: Jul. 20, 2000

(30) Foreign Application Priority Data

Jul. 21, 1999 (JP) .................................................. 11-206499
Aug. 4, 1999 (JP) .................................................. 11-221208

(51) Int. Cl.[7] ............................. B60G 17/00; B30R 16/02
(52) U.S. Cl. ................................. 701/36; 701/38; 701/45; 701/110; 340/440; 280/735; 180/271; 180/282
(58) Field of Search .................................. 701/36, 37, 38, 701/39, 45, 46, 110; 180/271, 282; 280/756, 734, 735; 340/440

(56) References Cited

U.S. PATENT DOCUMENTS 6,002,974 * 12/1999 Schiffmann ........................... 701/36
6,185,497    6/2001 Taniguchi et al. .................... 701/70

FOREIGN PATENT DOCUMENTS 2316455A  2/1998 (GB) .
6-297985  10/1994 (JP) .
8-268137  10/1996 (JP) .
10-273031 10/1998 (JP) .
10-309920 11/1998 (JP) .
11-14363   1/1999 (JP) .
11-83534   3/1999 (JP) .

* cited by examiner

Primary Examiner—Tan Nguyen
Assistant Examiner—Arthur D. Donnelly
(74) Attorney, Agent, or Firm—Law Offices of David G. Posz

(57) ABSTRACT

To estimate the readiness of overturn of vehicle accurately at quick timing corresponding to the behavior of an actual vehicle, at first, a roll angle $\phi 0$ and a roll rate $\phi 0'$ which indicate an actual tendency of overturn of a running vehicle are measured (calculated). Then, the maximum amplitude A (estimation value) is calculated based on an operational expression for estimating the maximum amplitude A of the behavior estimation value $\phi$ (t) of the roll angle $\phi$ before damp derived from the following physical model describing the vehicle behavior based on the roll angle $\phi$ indicating the overturn tendency of the running vehicle and the estimation value A is set as the overturn parameter X which indicates the readiness of overturn of the vehicle:

$$J\phi'' + D\phi' + K\phi = F$$

(where, J: roll inertia, D: damper constant, K: spring constant, F: centrifugal force, $\phi''$: roll rate differential value, $\phi'$: roll rate, $\phi$: roll angle).

21 Claims, 14 Drawing Sheets

VEHICLE BEHAVIOR ESTIMATING AND CONTROLLING METHOD AND SYSTEM AS WELL AS BODY SLIP ANGLE ESTIMATING METHOD AND SYSTEM

CROSS REFERENCE TO RELATED APPLICATION

This application is based upon and claims the benefit of priority of Japanese Patent Applications No. H.11-206499 filed on Jul. 21, 1999 and No.H.11-221208 filed on Aug. 4, 1999, the contents of which are incorporated herein by reference.

BACKGROUND OF THE INVENTION

1. Field of the Invention

The present invention relates to a vehicle behavior estimating method and system for estimating an overturn parameter representing the readiness of overturn of a vehicle in running the vehicle and to a vehicle behavior controlling method and system for preventing the overturn of the vehicle by using the vehicle behavior estimating method and system as well as to a body slip angle estimating method and a system for estimating a body slip angle in driving the vehicle.

2. Description of Related Art

Conventionally, there has been known a vehicle behavior control system for preventing an overturn (roll) of a vehicle by estimating the possibility of overturn (roll) of the vehicle in running the vehicle or in turning the vehicle for example by an overturn parameter which represents the readiness of the overturn (roll) of the vehicle and by controlling braking force applied to the respective wheels in correspondence to this overturn parameter.

There has been known a vehicle behavior control system using lateral acceleration acting on the vehicle as the overturn parameter described above. The vehicle behavior control system judges that there is much possibility that the vehicle overturns (rolls) (in other words, the roll angle of this vehicle is excessively large) when the lateral acceleration (the overturn parameter) detected by lateral acceleration sensors or the like mounted in the vehicle exceeds a predetermined value, e.g., 1G, and automatically control the braking force to the respective wheels to prevent the overturn (roll) of the vehicle. In concrete, it prevents the overturn (roll) by applying the braking force to the front wheel on the side of the turning outer wheel of the vehicle and by putting the running state of the vehicle in the tendency of under steering.

However, the control whose overturn parameter is the lateral acceleration is meaningless for vehicles, which do not overturn (roll) even if the lateral acceleration exceeds 1G. That is, when the lateral acceleration exceeds 1G (there is a case when that value is low depending on road surface), grip power of the wheel to the road surface is weakened and no more force which rolls (overturns) the vehicle is applied to the vehicle. Normally, the front wheel of the vehicle cannot keep the original turning course and causes side slip in this case and the vehicle running state is put into the tendency of under steering. Accordingly, it is meaningless to make the control using the lateral acceleration as its overturn parameter because it is unable to accurately represent the readiness of the overturn (roll) of the vehicle in the state in which the lateral acceleration exceeds 1G, i.e., the possibility of overturn (roll) of the vehicle, for the vehicles which do not overturn (roll) and cause only the side slip even when the lateral acceleration exceeds 1G.

Then, the present applicant has proposed a vehicle behavior control system using variation of revolution speed of the wheel as the overturn parameter (shown in Japanese Patent Application No. H.11-72568).

This vehicle behavior control system calculates revolution speed of the turning inner wheel when the turning inner wheel is not floating from the road surface as an estimation value from actual revolution speed of a turning outer wheel and actual lateral acceleration acting on the vehicle in the state in which the wheels are gripped fully to the road surface and calculates and uses an absolute value of the difference between this estimation value and the actual revolution speed of the turning inner wheel as an overturn parameter.

Because there is no friction between the turning inner wheel and the road surface in the state in which the turning inner wheel is floating from the road surface at this time, the revolution speed of the turning inner wheel becomes almost constant when a driver makes no accelerator control or brake control or extremely changes when the driver makes the accelerator control or the brake control. After all, the overturn parameter increases in any case.

When the overturn parameter exceeds a threshold value set in advance, i.e., when the vehicle behavior control system detects that the turning inner wheel has floated from the road surface, it judges that the vehicle is likely to overturn (roll) and prevents the overturn (roll) of the vehicle by automatically controlling the braking force to the respective wheels similarly to the conventional vehicle behavior control system described above.

That is, differing from the conventional vehicle behavior control system described above, this vehicle behavior control system prevents the overturn (roll) of the vehicle by applying the braking force to predetermined wheels only when the turning inner wheels float from the road surface, i.e., only when the control for preventing the overturn (roll) is truly required.

However, there has been a case when it is unable to fully prevent the overturn (roll) of the vehicle when the vehicle runs by changing lanes for example because its timing is too late by making the control for preventing the overturn (roll) after when the turning inner wheel has floated as described above.

That is, the driver turns over the steering before and after the lane change when the vehicle is driven while changing the lanes, so that the vehicle which has once rolled in the direction of the opposite side from the lane changing direction (or the steering direction) (indicated as a roll angle φ and a roll rate φ' in the vehicle in FIG. 9) rolls in the opposite direction thereof, thus causing a rock-back phenomenon that the direction of centrifugal force F acting on the vehicle is also reversed as shown in FIG. 9.

The amplitude (scale) of this rock-back becomes specifically large when the timing of rock-back coincides with the timing of steering made by the driver. Then, when the timing of rock-back coincides with the timing of steering as such, a vehicle that does not overturn (roll) even when the lateral acceleration becomes 1G during normal turn is liable to overturn (roll) by the equal lateral acceleration of 1G.

Further, although this rock-back differs depending on a type of vehicle and on the degree of attenuation, it occurs as oscillation of about 0.5 to 2 Hz, so that there is a case when the timing is too late and when it is unable to fully prevent the overturn (roll) of the vehicle by making the control for preventing the overturn (roll) after when the turning inner wheel (the wheel on the side of the steering direction in particular in this case) has floated. That is, there is a case when its timing is too late by changing the value of the overturn parameter for the first time when the turning inner wheel (wheel on the side of the steering direction) has floated.

Further, there has been known a body slip angle control as a technology for enhancing control stability in driving a vehicle or in turning the vehicle in particular.

This body slip angle control is a technology for reducing the body slip angle by estimating the body slip angle which is an angle formed between the direction of longitudinal axis of the vehicle body and the actual vehicle advancing direction and by appropriately increasing braking force (wheel cylinder pressure) applied to the front wheel on the side of the turning outer wheel in correspondence to the estimated body slip angle.

It is required to estimate the body slip angle at high precision in the body slip angle control. Hitherto, the body slip angle $\beta$ has been estimated by calculating an estimation value $\Delta\beta p$ of body slip angular velocity $\Delta\beta$ by using the following expression based on a yaw rate $\Delta\theta$ detected by a yaw rate sensor and the like mounted in the vehicle, lateral acceleration Gy detected by a lateral acceleration sensor and the like and body speed detected by a wheel speed sensor and the like and by integrating it:

$$\Delta\beta p = \Delta\theta - Gy/Vb \quad (1A)$$

However, there has been a problem in calculating the estimation value $\Delta\beta p$ of the body slip angular velocity $\Delta\beta$ based on the above expression (1A) that the estimation value $\Delta\beta p$ differs considerably from a true value $\Delta\beta$ when the vehicle spins or when a roll angle of the vehicle becomes large in driving the vehicle and that the body slip angle $\beta$ cannot be estimated accurately as a result.

The reason why the above-mentioned problem occurs will be explained by using FIGS. 19A and 19B.

At first, when the vehicle which is advancing in the direction of a yaw angle $\phi$ with respect to its running path before turning (path along the x-axis direction) spins and the body slip angle becomes $\beta$ as shown in FIG. 19A (or when the vehicle which is turning with yaw rate $\Delta\phi$ around a circle of radius R shown by a dotted chain line in FIG. 19A as a turning orbit spins and the body slip angle becomes $\beta$), the yaw rate sensor mounted in the vehicle detects a value represented by the following expression (2A) as yaw rate $\Delta\theta$ based on a yaw rate $\Delta\phi$ with respect to the yaw angle $\phi$ and body slip angular velocity $\Delta\beta$ with respect to the body slip angle $\beta$:

$$\Delta\theta = \Delta\phi + \Delta\beta \quad (2A)$$

It is noted that $\Delta\phi$ is a yaw rate which is detected by the yaw rate sensor when the vehicle turns along the circle of the radius R as described above without spinning and is described also as an actual yaw rate in the following explanation.

Then, when the vehicle spins as described above (or when the absolute value of the body slip angle $\beta$ is fully large as compared to zero), the lateral acceleration Gy detected by the lateral acceleration sensor mounted in the vehicle differs from the lateral acceleration Gy' (true value) which actually acts on the vehicle.

That is, because the lateral acceleration sensor detects the component in the direction orthogonal to the direction of the longitudinal axis of the body (the direction described as "Body Direction" in FIG. 19A) in the lateral acceleration Gy' which actually acts on the vehicle, i.e., the component in the direction inclined by the body slip angle $\beta$ with respect to the direction of the lateral acceleration Gy' which actually acts on the vehicle, as the lateral acceleration Gy, it is unable to detect the lateral acceleration accurately in the state when the lateral acceleration does not act in the direction orthogonal to the body longitudinal direction as the vehicle spins as described above.

Further, the lateral acceleration Gy detected by the lateral acceleration sensor also differs from lateral acceleration Gy' (true value) which actually acts on the vehicle when the roll angle $\phi$ becomes large as shown in FIG. 19B for example.

That is, the lateral acceleration sensor detects the component in the direction orthogonal to the body vertical axis (see FIG. 19B) in the lateral acceleration Gy' which actually acts on the vehicle, i.e., the component which faces down by the roll angle $\phi$ with respect to the direction of the lateral acceleration Gy' which actually acts on the vehicle, so that it is unable to detect the lateral acceleration accurately in the state when the roll angle $\phi$ becomes large as described above and the lateral acceleration does not act in the direction orthogonal to the body vertical axis.

Accordingly, it has been unable to estimate the body slip angle $\beta$ at high precision as a result by calculating the estimation value $\Delta\beta p$ of the body slip angular velocity $\Delta\beta$ based on the above-mentioned expression (1A) because the lateral acceleration cannot be detected accurately when the vehicle spins or the roll angle $\phi$ of the vehicle becomes large and the estimation value $\Delta\beta p$ differs considerably from the true value $\Delta\beta$.

SUMMARY OF THE INVENTION

The present invention has been devised to solve the above-mentioned problems and its object is to provide vehicle behavior estimating method and system which allow the readiness of overturn of vehicle to be accurately estimated at quick timing corresponding to the behavior of the actual vehicle as well as vehicle behavior controlling method and system for controlling the behavior of the vehicle based on the result of estimation.

According to a vehicle behavior estimating method for achieving the above-mentioned objects, a roll angle and a roll rate of the vehicle are measured while running the vehicle at first. Then, an estimation value of an overturn parameter which represents readiness of overturn of the vehicle is calculated by using the measured result of the roll angle and roll rate based on an operational expression derived from the following physical model describing the behavior of the vehicle during running based on the roll angle:

$$J\phi'' + D\phi' + K\phi = F$$

(where, J: roll inertia, D: dumper constant, K: spring constant, F: centrifugal force, $\phi''$: roll rate differential value, $\phi'$: roll rate, $\phi$: roll angle).

That is, according to the method mentioned above, the overturn parameter is calculated as the estimation value by using the measured result of the roll angle and roll rate representing the actual tendency of overturn (roll) of the running vehicle based on an operational expression derived from the physical model describing the behavior of the vehicle (overturn behavior) based on the roll angle which represents the tendency of overturn (roll) of the running vehicle.

Accordingly, the method according to the present invention allows the overturn parameter to be calculated as a value which increases/decreases stepwise in correspondence to the behavior (overturn behavior) of the actual vehicle and the readiness of overturn of the vehicle to be accurately estimated by the overturn parameter.

That is, the method mentioned above allows the readiness of overturn of the vehicle to be accurately estimated at quick timing before the turning inner wheel (the wheel on the side of the steering direction in case of lane change running) floats because the overturn parameter is calculated as the value increasing/decreasing stepwise in correspondence to the behavior (overturn behavior) of the actual vehicle from the point of time before the turning inner wheel (the wheel on the side of the steering direction in case of lane change running) floats.

It is noted that it is not always required to execute the arithmetic operation in which the measured result of the roll angle and roll rate to the above-mentioned operational expression in actually calculating the overturn parameter. For instance, it may be calculated by setting a map or the like for calculating the overturn parameter by using the measured result of the roll angle and roll rate as parameters for example.

As a concrete mode for calculating the overturn parameter, the above-mentioned operational expression may be set as an expression for estimating the maximum amplitude of the roll angle and an estimation value of the maximum amplitude of the roll angle may be calculated based on the operation expression to set the estimation value as the overturn parameter.

That is, although the operational expression for estimating the behavior of the roll angle maybe derived from the physical model described above and the estimation value of the roll angle is represented as what damp-oscillates in the operational expression for estimating the behavior of the roll angle, the operational expression for estimating the maximum amplitude of the roll angle derived from the operational expression for estimating the behavior of the roll angle is set as the operational expression for calculating the overturn parameter and a value obtained by applying the measured result of the roll angle and roll rate to this operational expression is calculated as the overturn parameter.

Because the overturn parameter is calculated as a value estimating the readiness of overturn (roll) of the running vehicle, i.e., the possibility of overturn (roll), to be always large (the risk side) in this case, the method allows the readiness of overturn (roll) of the vehicle to be accurately estimated at quick timing steadily before the turning inner wheel (the wheel on the side of the steering direction in case of lane change running) floats.

It is noted that the operational expression for estimating the behavior of the roll angle derived from the physical model described above and the operational expression for estimating the maximum amplitude of the roll angle derived from the operational expression for estimating the behavior of the roll angle will be described later in detail in the embodiment.

Further, as another concrete mode for calculating the overturn parameter, the operational expression may be set as an expression for estimating the behavior of the roll angle and an estimation value of the roll angle after an elapse of predetermined time in which the delay of control in controlling the behavior of the vehicle is taken into account may be calculated based on the operational expression to set the estimation value as the overturn parameter.

That is, although the operational expression for estimating the behavior of the roll angle derived from the physical model described above is set as the operational expression for calculating the overturn parameter and the value obtained by applying the measured result of the roll angle and roll rate to the operational expression is calculated as the overturn parameter by this method, the control delay occurs in the control system in actually controlling the behavior of the vehicle based on the overturn parameter thus calculated. Therefore, the estimation value of the roll angle after the elapse of the predetermined time, taking this control delay into account, is calculated as the overturn parameter.

Accordingly, the method mentioned above allows the estimation value of the roll angle at the point of time when the vehicle is actually controlled to be calculated as the overturn parameter and allows the readiness of overturn (roll) of the vehicle to be accurately estimated at quick timing steadily before the turning inner wheel (the wheel on the side of the steering direction in case of the lane change running) floats.

The behavior of the vehicle may be controlled adequately corresponding to the actual behavior of the vehicle (overturn behavior) during control by controlling the behavior of the vehicle based on the overturn parameter thus calculated.

As another concrete mode for calculating the overturn parameter, the operational expression may be set as an expression for estimating the behavior of the roll angle and an estimation value of the roll angle when it becomes maximum next may be calculated based on the operational expression to set the estimation value as the overturn parameter.

That is, although the operational expression for estimating the behavior of the roll angle derived from the physical model described above is set as the operational expression for calculating the overturn parameter and the value obtained by applying the measured result of the roll angle and roll rate to the operational expression is calculated as the overturn parameter, the estimation value of the roll angle is represented as what damp-oscillates by the operational expression for estimating the behavior of the roll angle. Therefore, the estimation value of the roll angle when it becomes maximum next is calculated as the overturn parameter based on the operational expression for estimating the behavior of the roll angle.

Accordingly, the method allows the readiness of overturn (roll) of the vehicle to be accurately estimated at quick timing steadily before the turning inner wheel (the wheel on the side of the steering direction in case of the lane change running) floats because the possibility of overturn (roll) is calculated as a value always estimating it at maximum (risk side).

Another object of the present invention is to provide a vehicle behavior estimating system having a structure for realizing the method mentioned above. At first, a roll angle and a roll rate of the vehicle during running is measured by vehicle state detecting means. Next, an estimation value of an overturn parameter which represents readiness of overturn of a running vehicle by using the roll angle and roll rate measured by the vehicle state detecting means based on an operational expression derived from the following physical model describing the behavior of the vehicle during running based on the roll angle:

$$J\phi'' + D\phi' + K\phi = F$$

(where, J: roll inertia, D: dumper constant, K: spring constant, F: centrifugal force, $\phi''$: roll rate differential value, $\phi'$: roll rate, $\phi$: roll angle).

Therefore, the above-mentioned system allows the overturn parameter to be calculated as a value increasing/decreasing stepwise in correspondence to the behavior (overturn behavior) of the actual vehicle and allows the readiness of overturn of the vehicle to be estimated accurately by the overturn parameter.

That is, the system allows the readiness of overturn of the vehicle to be estimated accurately at quick timing before the turning inner wheel (the wheel on the side of the steering direction in case of the lane change running) floats because it allows the overturn parameter to be calculated as the value increasing/decreasing stepwise in correspondence to the behavior (overturn behavior) of the actual vehicle from the point of time before the turning inner wheel (the wheel on the side of the steering direction in case of the lane change running).

Preferably, the operational expression described above is set as an expression for estimating the maximum amplitude of the roll angle and the overturn parameter estimating means calculates an estimation value of the maximum amplitude of the roll angle based on the operation expression to set the estimation value as the overturn parameter.

Therefore, because the overturn parameter is calculated as a value estimating the readiness of overturn (roll) of the running vehicle, i.e., the possibility of overturn (roll), to be always large (the risk side), the system allows the readiness of overturn of the vehicle to be accurately estimated at quick timing steadily before the turning inner wheel (the wheel on the side of the steering direction in case of lane change running) floats.

Further, the operational expression described above is set as an expression for estimating the behavior of the roll angle and the overturn parameter estimating means calculates an estimation value of the roll angle after an elapse of predetermined time in which the control delay in controlling the behavior of the vehicle is taken into account to set the estimation value as the overturn parameter.

Therefore, the system allows the readiness of overturn of the vehicle to be accurately estimated at quick timing steadily before the turning inner wheel (the wheel on the side of the steering direction in case of lane change running) floats because it allows the estimation value of the roll angle at the point of time in actually controlling the behavior of the vehicle to be calculated as the overturn parameter.

Then, the behavior of the vehicle may be adequately controlled corresponding to the actual behavior of the vehicle (overturn behavior) during the control by controlling the behavior of the vehicle based on the overturn parameter thus calculated.

Furthermore, in the system, the operational expression described above is set as an expression for estimating the behavior of the roll angle and the overturn parameter estimating means calculates an estimation value of the roll angle which becomes maximum in the next time based on this operational expression to set the estimation value as the overturn parameter.

Therefore, the system allows the readiness of overturn (roll) of the vehicle to be accurately estimated at quick timing steadily before the turning inner wheel (the wheel on the side of the steering direction in case of lane change running) floats because the overturn parameter is calculated as a value estimating the readiness of overturn (roll) of the vehicle, i.e., the possibility of overturn (roll), always at maximum (risk side).

Meanwhile, as a concrete mode for measuring the roll angle and the roll rate of the running vehicle by the vehicle state detecting means, the vehicle state detecting means may be arranged so as to cause roll rate measuring means to measure the roll rate of the vehicle and roll angle calculating means to calculate the roll angle by applying the measured roll rate to a physical model describing the relationship between the roll rate and the roll angle of vehicle.

It allows the roll angle and the roll rate of the running vehicle used in calculating the overturn parameter to be measured.

In this case, a concrete mode of the roll rate measuring means described above may be a roll rate sensor mounted on the vehicle for example.

It is noted that the physical model describing the relationship between the roll rate and the roll angle will be described in detail in the embodiment described later.

As another concrete mode for measuring the roll angle and the roll rate of the running vehicle by the vehicle state detecting means, the vehicle state detecting means may be arranged so as to cause lateral acceleration measuring means to measure lateral acceleration of the vehicle, roll angle calculating means to calculate the roll angle by applying the measured lateral acceleration to a physical model describing the relationship between the lateral acceleration and the roll angle of vehicle and roll rate calculating means to calculate the roll rate of the vehicle by differentiating the calculated roll angle.

It allows the roll angle and the roll rate of the running vehicle used in calculating the overturn parameter to be measured without using the roll rate sensor.

It is noted that the physical model describing the relationship between the lateral acceleration and the roll angle will be described in detail in the embodiment described later.

As a still other concrete mode for measuring the roll angle and the roll rate of the running vehicle by the vehicle state detecting means, the vehicle state detecting means may be arranged so as to cause yaw rate measuring means to measure yaw rate of the vehicle, body speed measuring means to measure body speed of the vehicle, roll angle calculating means to calculate the roll angle by applying the measured yaw rate and body speed to a physical model describing the relationship among the yaw rate, body speed and roll angle of vehicle and roll rate calculating means to calculate the roll rate of the vehicle by differentiating the calculated roll angle.

It allows the roll angle and the roll rate of the running vehicle used in calculating the overturn parameter to be measured without using the roll rate sensor.

It is noted that the physical model describing the relationship among the yaw rate, body speed and roll angle will be described in detail in the embodiment described later.

As a still other concrete mode for measuring the roll angle and the roll rate of the running vehicle by the vehicle state detecting means, the vehicle state detecting means may be arranged so as to cause steering angle measuring means to measure a steering angle of the vehicle, body speed measuring means to measure body speed of the vehicle, roll angle calculating means to calculate the roll angle by applying the measured steering angle, body speed and roll angle of the vehicle to a physical model describing the relationship among the steering angle, body speed and roll angle of the vehicle and roll rate calculating means to calculate the roll rate of the vehicle by differentiating the calculated roll angle.

It allows the roll angle and the roll rate of the running vehicle used in calculating the overturn parameter to be measured without using the roll rate sensor.

It is noted that the physical model describing the relationship among the steering angle, body speed and roll angle will be described in detail in the embodiment described later.

As a still other concrete mode for measuring the roll angle and the roll rate of the running vehicle by the vehicle state detecting means, the vehicle state detecting means may be arranged so as to cause wheel speed measuring means to measure revolution speed of each wheel of the vehicle, respectively, roll angle calculating means to calculate the roll angle by applying the measured revolution speed of the respective wheels to a physical model describing the relationship between the difference of speed of turning inner and outer wheels, obtained by subtracting a sum of revolution speeds of the front and rear wheels on the left side from a sum of revolution speeds of the front and rear wheels on the right side of the vehicle, and the roll angle of the vehicle and roll rate calculating means to calculate the roll rate of the vehicle by differentiating the calculated roll angle.

It allows the roll angle and the roll rate of the running vehicle used in calculating the overturn parameter to be measured without using the roll rate sensor.

It is noted that the physical model describing the relationship between the difference of speed of turning inner and outer wheels and roll angle will be described in detail in the embodiment described later.

It is a further object to provide a vehicle behavior controlling method. According to the method, an overturn parameter that represents the readiness of overturn of the vehicle during running is estimated by the vehicle behavior estimating method mentioned above. Then, when the estimated overturn parameter is greater than a predetermined value, braking force is applied to a predetermined wheel to prevent the vehicle from overturning.

That is, it is judged that the vehicle is liable to overturn (roll) when the overturn parameter estimated by the vehicle behavior estimating method mentioned above becomes greater than the predetermined value and the braking force is applied to the predetermined wheel to prevent the vehicle from overturning (rolling).

The method allows preventing the vehicle from overturning (rolling) reliably because the control for preventing the overturn (roll) of the vehicle is carried out based on the overturn parameter estimated by the vehicle behavior estimating method.

That is, the vehicle behavior estimating method allows the readiness of overturn (roll) of the vehicle to be accurately estimated at quick timing before the turning inner wheel (the wheel on the steering direction side in case of lane change running) floats as described above, so that the braking force may be applied to the predetermined wheel at fully quick timing even when the vehicle makes the lane change running and causes the rock-back phenomena and it becomes possible to prevent the overturn (roll) of the vehicle reliably as a result.

Then, when the overturn parameter becomes greater than the predetermined value and it is judged that the possibility of overturn (roll) of the vehicle is high, the overturn (roll) may be prevented by applying the braking force to the front wheels or to the front and rear wheels on the side of the turning outer wheel (in other words, on the opposite side from the steering direction) and by putting the running state of the vehicle into the under-steer tendency for example as a concrete mode for applying the braking force to the predetermined wheel to prevent the overturn (roll) of the vehicle.

It is also possible to prevent the overturn (roll) by dropping the vehicle driving speed by applying the braking force to the both front wheels or to all wheels.

Moreover, it is a further object to provide a vehicle behavior control system having a structure for realizing the vehicle behavior controlling method described above, wherein the overturn parameter indicating the readiness of overturn of the vehicle is estimated by the vehicle behavior estimating system mentioned above. Then, when the estimated overturn parameter is greater than the predetermined value, the braking force is applied to a predetermined wheel by the control means to prevent the overturn of the vehicle.

The system allows preventing the overturn (roll) of the vehicle reliably because the control for preventing the overturn (roll) of the vehicle is made based on the overturn parameter estimated by the vehicle behavior estimating system.

That is, the vehicle behavior estimating system allows the readiness of overturn (roll) of the vehicle to be accurately estimated at quick timing before the turning inner wheel (the wheel on the steering direction side in case of lane change running) floats as described above, so that the braking force may be applied to the predetermined wheel at fully quick timing even when the vehicle makes the lane change running and causes the rock-back phenomena and it becomes possible to prevent the overturn (roll) of the vehicle reliably as a result.

Further object of the present invention is to provide body slip angle estimating method and system that enable to estimate the body slip angle accurately even when the vehicle spins or when the roll angle of the vehicle becomes large.

According to the body slip angle estimating method, yaw rate $\Delta\theta$, lateral acceleration $Gy$ and body speed $Vb$ of a running vehicle are measured at first. Then, a body slip angular velocity estimation value $\Delta\beta H$ is calculated by applying the yaw rate $\Delta\theta$, lateral acceleration $Gy$ and body speed $Vb$ measured as described above to the following expression using a delay element $H3$ set in advance to compensate measuring errors of the lateral acceleration:

$$\Delta\beta H = H3(\Delta\theta) - Gy/Vb.$$

Then, a body slip angle estimation value $\beta H$ is calculated by integrating the body slip angular velocity estimation value $\Delta\beta H$.

Therefore, the method allows the body slip angular velocity estimation value $\Delta\beta H$ to be calculated as a value close to the actual body slip angular velocity $\Delta\beta$ (true value) even when the vehicle spins or when the role angle of the vehicle becomes large and as a result, allows the body slip angle $\beta$ to be estimated at high precision as the estimation value $\beta H$.

It is also possible to enhance the control stability of the vehicle in driving the vehicle or in turning the vehicle in particular by reducing the body slip angle by appropriately increasing braking force (wheel cylinder pressure) applied to the front wheel on the side of outer turning wheel in turning the vehicle for example based on this body slip angle estimation value $\beta H$.

As a concrete mode of the expression and the delay element $H3$ for calculating the body slip angular velocity estimation value $\Delta\beta H$, the expression for calculating the body slip angular velocity estimation value $\Delta\beta H$ may be what is led from a physical model describing the relationship between the yaw rate and a roll angle of the vehicle by using a secondary delay element $H1$ of the yaw rate and a physical model describing the relationship between the lateral acceleration and the roll angle by using a primary delay element $H2$ of the lateral acceleration; and the delay element $H3$ may be a delay element represented by the following expression using the secondary delay element $H1$ and the primary delay element $H2$: $H3=H1/H2$ in the body slip angle estimating method.

Then, it was found that the body slip angle estimation value $\beta H$ calculated by integrating the body slip angular velocity estimation value ΔβH calculated by the expression for calculating the body slip angular velocity estimation value ΔβH almost coincides with the actual body slip angle β even when the vehicle spins or when the role angle of the vehicle becomes large as a result of experiments described later in the exemplary experiments and that this estimation value βH is applicable as a value accurately estimating the actual body slip angle β.

That is, the method allows the body slip angular velocity estimation value ΔβH to be calculated as a value close to the true value Δβ even when the vehicle spins or when the role angle of the vehicle becomes large because H3 (Δθ) which is a correction value of the yaw rate Δθ is set as a value to which a measuring error of the lateral acceleration Gy is added in the expression for calculating the body slip angular velocity estimation value ΔβH lead from the above-mentioned physical models and allows the body slip angle β to be estimated at high precision as the estimation value βH as a result.

It is noted that the physical model describing the relationship between the yaw rate and the role angle by using the secondary delay element H1 of the yaw rate, the physical model describing the relationship between the lateral acceleration and the role angle by using the primary delay element H2 of the lateral acceleration and the relationship (leading procedure) of the expression for calculating the body slip angular velocity estimation value ΔβH "ΔβH=H3(Δθ)−Gy/Vb" with those physical models are described later in detail in an embodiment described later.

Meanwhile, a concrete method for measuring the yaw rate Δθ, lateral acceleration Gy and body speed Vb used in calculating the body slip angular velocity estimation value ΔβH and the body slip angle estimation value βH may be what detects the yaw rate Δθ by a yaw rate sensor mounted in the vehicle for example, detects the lateral acceleration Gy by a lateral acceleration sensor mounted in the vehicle for example and detects the body speed Vb as an average value (average driven wheel speed) of revolution speed of the right and left driven wheels obtained from wheel speed sensors mounted respectively on rotary shafts of the right and left driven wheels (front wheels in case of a front-engine and rear-drive type vehicle).

The method for measuring the body speed Vb is not limited to the mode described above and may be what corrects the revolution speed of the respective wheels obtained from the wheel speed sensors mounted respectively on the rotary shafts of the respective wheels by using the yaw rate Δθ measured by another method and detects a value of a wheel whose wheel speed is the largest among the corrected revolution speeds of the respective wheels at the present moment as the body speed Vb (estimated value) when the vehicle is decelerating or detects a value of a wheel whose wheel speed is the smallest among the corrected revolution speeds of the respective wheels at the present moment as the body speed Vb (estimated value) when the vehicle is not decelerating.

The method for measuring the lateral acceleration Gy may be what calculates the lateral acceleration by measuring the roll rate of the vehicle at first and by applying the roll rate measured as described above to the physical model describing the relationship between the roll rate and the lateral acceleration.

That is, the roll rate of the vehicle is measured at first and the lateral acceleration Gy is calculated (the estimation value GyH of the lateral acceleration Gy to be concrete) based on the measured roll rate. That is, the lateral acceleration Gy is not measured directly in measuring the lateral acceleration Gy used in calculating the body slip angular velocity estimation value ΔβH and the body slip angle estimation value βH.

Therefore, the method allows the lateral acceleration Gy (estimated value GyH) used in calculating the body slip angular velocity estimation value ΔβH and the body slip angle estimation value βH to be measured without using a lateral acceleration sensor.

It is noted that the physical model describing the relationship between the roll rate and the lateral acceleration will be described later in detail in the embodiment.

Next, the body slip angle estimating system is provided with a structure for realizing the methods mentioned above and is arranged so as to measure yaw rate Δθ of a running vehicle by yaw rate measuring means, lateral acceleration Gy by lateral acceleration measuring means, and body speed Vb by body speed measuring means. Next, body slip angular velocity estimation value calculating means calculates a body slip angular velocity estimation value ΔβH by applying the yaw rate Δθ, lateral acceleration Gy and body speed Vb measured as described above to the following expression using a delay element H3 set in advance to compensate measuring errors of the lateral acceleration Gy:

$$\Delta\beta H = H3(\Delta\theta) - Gy/Vb.$$

Then, body slip angle estimation value calculating means calculate a body slip angle estimation value βH by integrating the body slip angular velocity estimation value ΔβH calculated by the body slip angular velocity estimation value calculating means.

Therefore, the method allows the body slip angular velocity estimation value ΔβH to be calculated as a value close to the actual body slip angular velocity Δβ (true value) by the body slip angular velocity estimation value calculating means even when the measuring error of the lateral acceleration Gy is large, i.e., when the vehicle spins or when the roll angle of the vehicle becomes large. As a result, the body slip angle estimation value βH may be calculated by the body slip angle estimation value calculating means as a value accurately estimating the actual body slip angle β.

It is also possible to enhance the control stability of the vehicle in driving the vehicle or in turning the vehicle in particular by reducing the body slip angle by appropriately increasing braking force (wheel cylinder pressure) applied to the front wheel on the side of outer turning wheel in turning the vehicle for example based on this body slip angle estimation value βH.

The body slip angle estimating system having a structure for realizing the method mentioned above is so arranged that an expression for calculating the body slip angular velocity estimation value ΔβH used by the body slip angular velocity estimation value calculating means is what is led from a physical model describing the relationship between the yaw rate and a roll angle of the vehicle by using a secondary delay element H1 of the yaw rate and a physical model describing the relationship between the lateral acceleration and the roll angle by using a primary delay element H2 of the lateral acceleration; and the delay element H3 is a delay element represented by the following expression using the secondary delay element H1 and the primary delay element H2:

$$H3 = H1/H2.$$

H3 (Δθ) which is a correction value of the yaw rate Δθ is set as a value to which a measuring error of the lateral acceleration Gy is added in the expression for calculating the body slip angular velocity estimation value ΔβH led from the above-mentioned physical models, so that the body slip angular velocity estimation value ΔβH may be calculated as a value close to the true value Δβ even when the vehicle spins or when the roll angle of the vehicle becomes large. As a result, the body slip angle estimation value βH may be calculated by the body slip angle estimation value calculating means as a value accurately estimating the actual body slip angle β.

According to the body slip angle estimating system having a structure for realizing the method mentioned above, the lateral acceleration measuring means measures the roll rate of the vehicle by roll rate measuring means and lateral acceleration calculating means calculates the lateral acceleration by applying the roll rate measured as described above to the physical model describing the relationship between the roll rate and the lateral acceleration.

Accordingly, the lateral acceleration Gy (estimated value GyH of the lateral acceleration Gy to be concrete) used in calculating the body slip angular velocity estimation value ΔβH and the body slip angle estimation value βH may be measured without using lateral acceleration sensors.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form apart of this application. In the drawings:

DETAILED DESCRIPTION OF THE PREFERRED EMBODIMENTS

Embodiments of the present invention will be explained below with reference to the drawings.

[First Embodiment]

Figure 1:
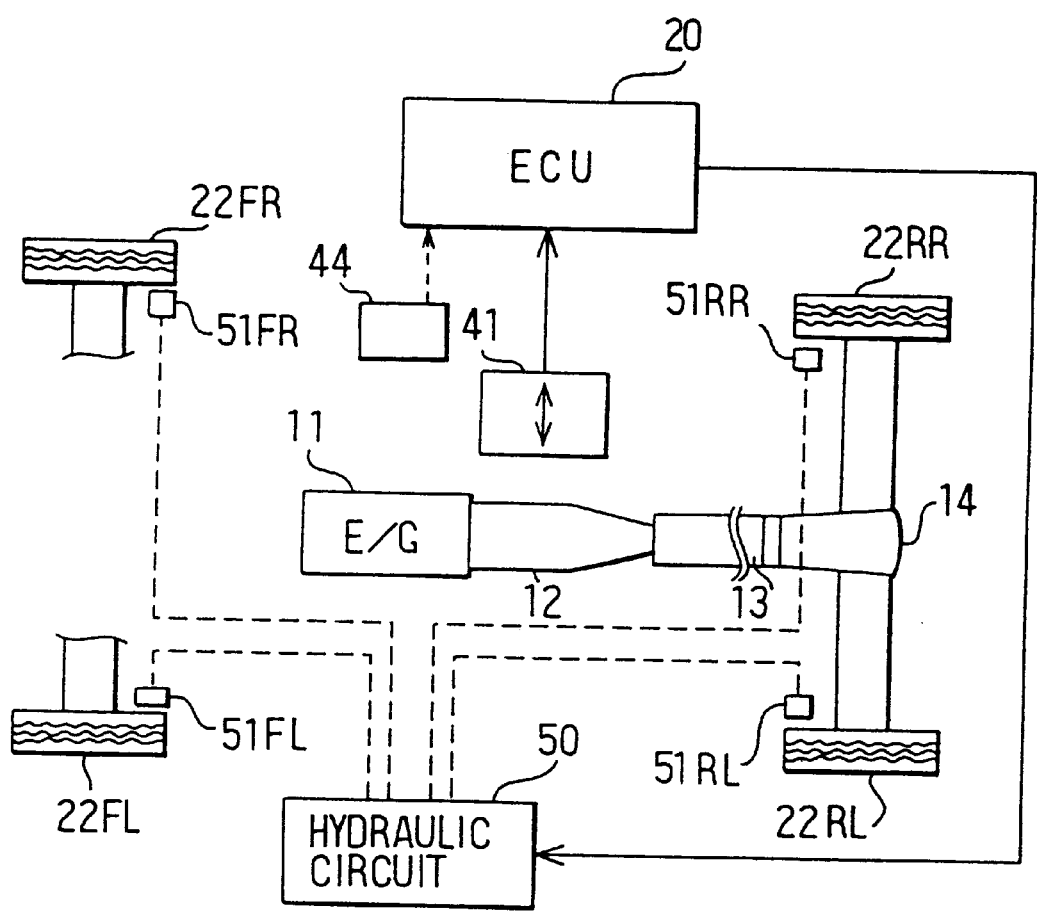
FIG. 1 is a schematic structural view showing the whole structure of a vehicle behavior control system according to a first embodiment.

FIG. 1 is a schematic structural view showing the whole structure of a vehicle behavior control system according to one embodiment (first embodiment) to which the invention is applied. It is noted that the vehicle behavior control system of the present embodiment is applied to a front-engine rear-drive (FR) type vehicle.

As shown in FIG. 1, driving force (driving torque) of the vehicle outputted from an internal combustion engine 11 via a transmission 12 is distributed to right and left rear wheels (driving wheels) (rear left wheel 22RL and rear right wheel 22RR) via a propeller shaft 13 and a differential gear 14.

Hydraulic braking units (hereinafter referred also to as a wheel cylinder) 51FL, 51FR, 51RL and 51RR for giving braking force to the respective wheels 22FL to 22RR are provided at the respective wheels (front left wheel 22FL, front right wheel 22FR, rear left wheel 22RL and rear right wheel 22RR) of the vehicle.

Then, when a driver manipulates the brake, brake oil is force-fed to the respective wheel cylinders 51FL through 51RR via a hydraulic circuit 50 and braking force is applied to the respective wheels 22FL through 22RR.

The vehicle is also provided with a lateral acceleration sensor 41 as lateral acceleration measuring means and a detection signal from the lateral acceleration sensor 41 is inputted to an electronic control unit (ECU) 20 constructed centering on a microcomputer comprising a CPU, a ROM, a RAM and others.

The ECU 20 controls the braking force applied to the respective wheels 22FL through 22RR by controlling the braking hydraulic pressure applied to the respective wheel cylinders 51FL through 51RR by driving various actuators provided within the hydraulic circuit 50 based on the input signal from the lateral acceleration sensor 41 beside the control of the brake manipulated by the driver.

That is, the ECU 20 estimates an overturn parameter representing the readiness of overturn of the vehicle by using the input signal from the lateral acceleration sensor 41 during drive of the vehicle and executes control for preventing overturn of vehicle by appropriately increasing the braking force (wheel cylinder pressure) applied to the front wheel on the side of the turning outer wheel (or the wheel on the opposite side from the steering direction) among the left and right front wheels 22FL and 22FR to prevent the overturn (roll) of the vehicle in correspondence to this overturn parameter.

Next, the hydraulic circuit 50 used in controlling such braking force will be explained.

Figure 2:
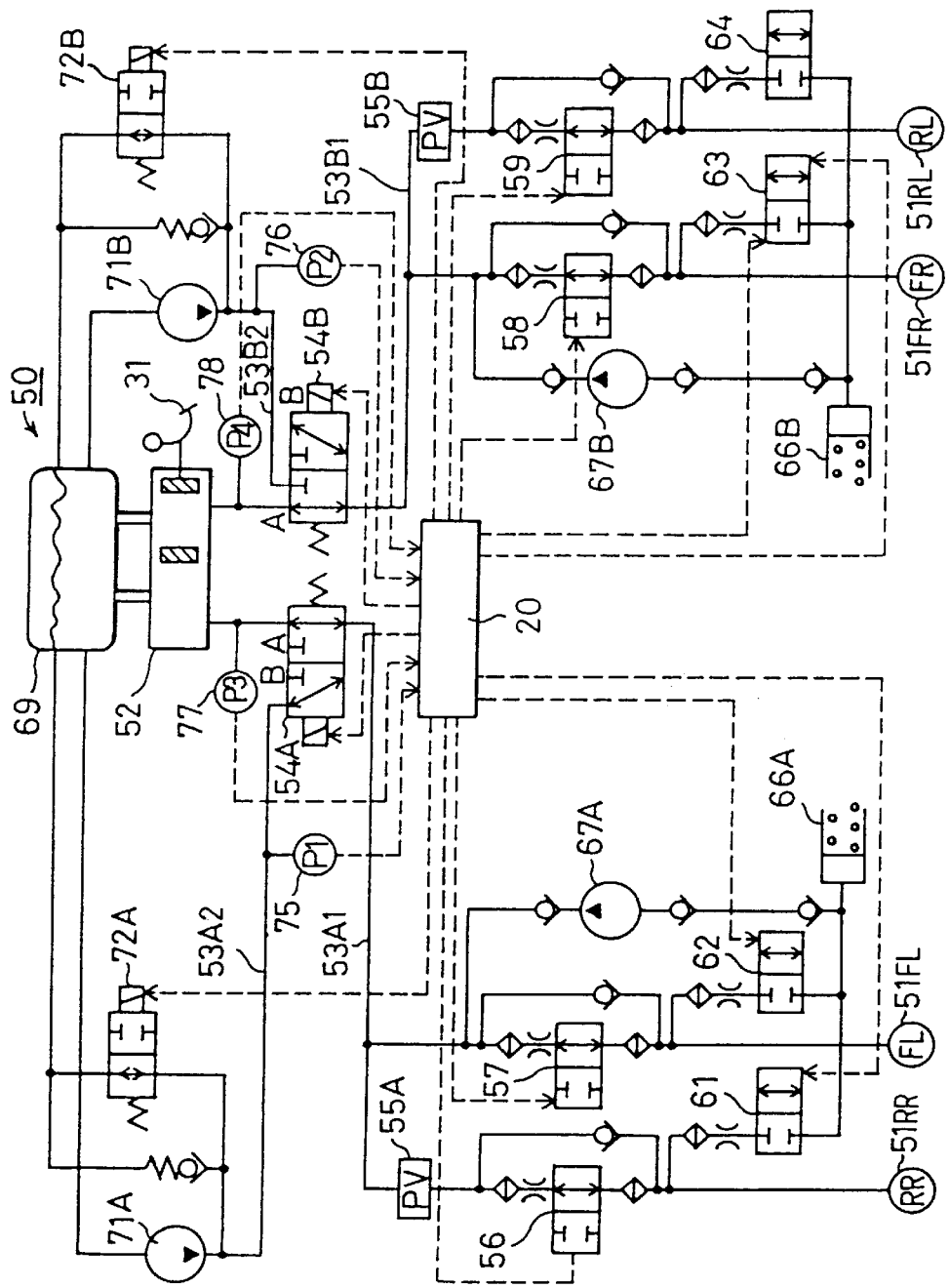
FIG. 2 is an explanatory diagram for explaining the structure of a hydraulic circuit of first and second embodiments.

As shown in FIG. 2, the hydraulic circuit 50 is constructed by a diagonal type frame piping comprising respective piping systems of the front left wheel 22FL and rear right wheel 22RR and the front right wheel 22FR and rear left wheel 22RL.

Among these piping systems, a three-way change-over valve 54A used to change over the hydraulic circuit (capable of changing to two positions), a proportion valve 55A for applying high hydraulic pressure to the wheel cylinder 51FL of the front left wheel 22FL, pressure increase control valves 56 and 57 for controlling opening/closing of a line from the master cylinder 52 to the wheel cylinders 51RR and 51FL, pressure decrease control valves 61 and 62 for controlling opening/closing a line from the wheel cylinders 51Rr and 51FL to a reservoir 66A, the reservoir 66A for reserving brake oil from the wheel cylinders 51RR and 51FL and a pump 67A for pumping the brake oil from the reservoir 66A to the side of the master cylinder 52 are provided in a line 53A1 from the master cylinder 52 for force-feeding brake oil as the driver manipulates a brake pedal 31 to the wheel cylinders 51FL and 51RR of the front left wheel 22FL, the rear right wheel 22RR. A pump 71A for boosting the brake hydraulic pressure and a pressure control valve 72A for controlling opening/closing of a line between the downstream side of the pump 71A and a master reservoir 69 in a line 53A2 from the master reservoir 69 to the three-way change-over valve 54A.

When the three-way change-over valve 54A is switched to position A, it becomes possible to carry out the normal braking operation by the driver and known anti-skid control using the pressure increase control valves 56 and 57, the pressure decrease control valves 61 and 62, the reservoir 66A, the pump 67A and others in the line 53A1. Meanwhile, when the three-way change-over valve 54A is switched to position B, it becomes possible to carry out vehicle overturn preventing control by the high brake hydraulic pressure caused by the pump 71A.

There are also provided a three-way change-over valve 54B which can be switched to two positions, a proportion valve 55B, pressure increase control valves 58 and 59, pressure decrease control valves 63 and 64, a reservoir 66B and a pump 67B are provided in the other line 53B1 from the master cylinder 52 to the wheel cylinders 51FR and 51RL of the front wheel 22FR and front wheel 22RL similarly to the line 52A1 in the piping systems described above. A pump 71B and a pressure control valve 72B are also provided in a line 53B2 from the master reservoir 69 to the three-way change-over valve 54B similarly to the line 53A2 described above.

The hydraulic circuit 50 is also provided with first and second pressure sensors 75 and 76 for detecting hydraulic pressure in the line from the respective pumps 71A and 71B to the respective three-way change-over valves 54A and 54B and pressure sensors 77 and 78 for detecting hydraulic pressure in the line from the master cylinder 52 to the respective three-way change-over valves 54A and 54B. Detection signals from the respective sensors 75 through 78 are also inputted to the ECU 20. Then, based on these detection signals, the ECU 20 controls the brake hydraulic pressure (braking force applied to the respective wheels 22FL through 22RR) applied to the respective wheel cylinders 51FL through 51RR by controlling the various actuators, i.e., the pressure increase control valves 56 through 59, the pressure decrease control valves 61 through 64, the pumps 67A and 67B, the pumps 71A and 71B, and the pressure control valves 72A and 72B.

Next, the vehicle overturn preventing control process (vehicle behavior control process) which is the main process related to the present invention, among the control processes repeatedly executed by the ECU 20 while running the vehicle (after when an ignition switch of the vehicle (not shown) is turned ON in concrete), will be explained along a flowchart shown in FIG. 3.

Figure 3:
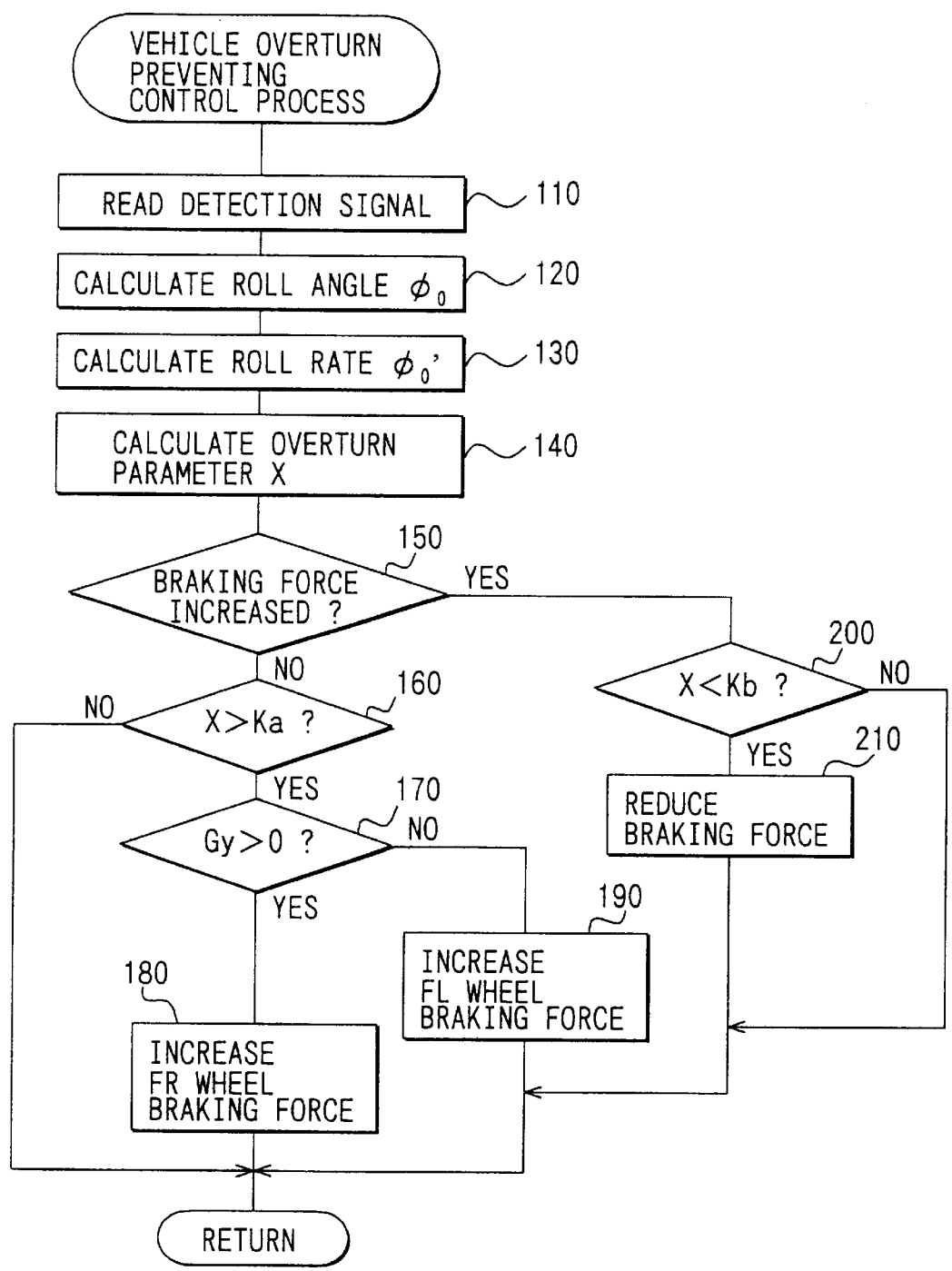
FIG. 3 is a flowchart showing a vehicle overturn preventing control process executed in an electronic control unit (ECU) in the first embodiment.

When the vehicle overturn preventing control process is started as shown in FIG. 3, the ECU 20 reads a detection signal from the lateral acceleration sensor 41 in S110 (S denotes a step). In S120, the ECU 20 calculates a roll angle $\phi 0$ by applying lateral acceleration Gy of the vehicle detected from the input signal from the lateral acceleration sensor 41 to a physical model (Laplace transformed model) describing the relationship between the lateral acceleration Gy and the roll angle $\phi 0$ of the vehicle which is represented by the following expression:

$$\phi 0 = \frac{K1}{s+K2} \cdot Gy \tag{1}$$

It is noted that the lateral acceleration Gy which is a detection value from the lateral acceleration sensor 41 is outputted as a positive value during left turn and as a negative value during right turn and the roll angle $\phi 0$ is calculated as a positive value when the vehicle inclines to the right side and as a negative value when the vehicle inclines to the left side.

Next, the ECU 20 calculates a roll rate $\phi 0'$ of the vehicle by applying and differentiating the roll angle $\phi 0$ calculated in S120 to the following expression (2) in S130:

$$\phi 0' = s \cdot \phi 0 \tag{2}$$

In S140, the ECU 20 calculates an estimation value A of the maximum amplitude of a behavior estimation value $\phi(t)$ of the roll angle by using the measured result of the roll angle $\phi 0$ and the roll rate $\phi 0'$ indicating the actual tendency of overturn (roll) of the running vehicle calculated in S120 and S130 based on the following operational expression (3) for estimating the maximum amplitude of the behavior estimation value $\phi(t)$ of the roll angle $\phi$ defined by the expression (6) described later and sets the estimation value A as an overturn parameter X which represents the readiness of overturn of the vehicle:

$$X = A = \sqrt{\phi 0^2 + \left(\frac{\phi 0' + p \cdot \phi 0}{w}\right)} \tag{3}$$

(where, p and w: characteristic values (constant) of an oscillating system)

It is noted that a map (not shown) which sets the relationship between the roll angle $\phi 0$ and the roll rate $\phi 0'$ and the overturn parameter X in advance is used in calculating the overturn parameter X so as to be able to readily calculate the overturn parameter X corresponding to the expression (3) by setting the measured result of the roll angle $\phi 0$ and the roll rate $\phi 0'$ as parameters.

Here, the above expression (3) used in finding the overturn parameter X is set as follows in S140.

At first, the physical model describing the behavior of the vehicle (overturn behavior) during running based on the roll angle $\phi$ indicating the tendency of overturn (roll) of the running vehicle is represented as follow:

$$J\phi'' + D\phi' + K\phi = F \tag{4}$$

(where, J: roll inertia, D: damper constant, K: spring constant, F: centrifugal force, $\phi''$: roll rate differential value, $\phi'$: roll rate, $\phi$: roll angle)

Figure 9:
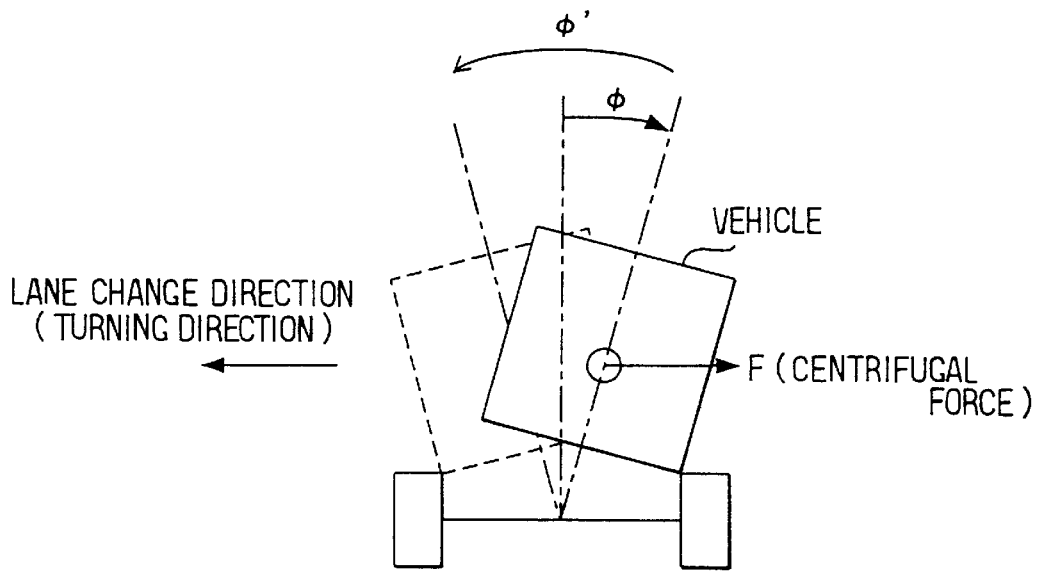
FIG. 9 is an explanatory diagram for explaining the behavior of the vehicle in making a turn or in making a lane change running.

It is noted that among the above-mentioned parameters, the centrifugal force F (see FIG. 9) may be represented like the following expression (5) when the lateral acceleration Gy of the vehicle detected from the input signal from the lateral acceleration sensor 41 is used:

$$F = \frac{W \cdot h}{g} \cdot Gy \tag{5}$$

(where, W: weight of vehicle, h: height of center of gravity of vehicle, g: gravitational acceleration)

Then, the following operational expression (6) for estimating the behavior of the roll angle φ may be derived from the expressions (4) and (5):

$$\phi(t) = A \cdot e^{-\frac{Pt}{2}} \cdot \sin(w \cdot t + \theta) + \frac{W \cdot h}{g \cdot K} \cdot Gy \tag{6}$$

It is noted that among the above-mentioned parameters, A is the maximum amplitude (estimation value) of the behavior estimation value φ(t) of the roll angle φ defined by the expression (3), $e^{-(p, t/)}$ is a damping element and sin (w·t+θ) is a resonance element. In the resonance element, a phase angle φ is calculated as a constant corresponding to the measured result of the roll angle φ0 and the roll rate φ0' indicating the actual overturn (roll) tendency of the running vehicle.

Then, the use of the expression (6) allows the behavior estimation value φ(t) of the roll angle φ after an elapse of time t when external force (centrifugal force F here) acting on the vehicle in the initial state (state at point of time t=0 when the roll angle is measured to be φ0 and the roll rate as φ0') is supposed to be constant to be calculated.

Then, while the roll angle φ(t) (behavior estimation value) is represented as what damp-oscillates in the expression (6), the maximum amplitude A (estimation value) before the damp of the roll angle φ(t) (behavior estimation value) is calculated as a value increasing/decreasing stepwise corresponding to the measured result of the roll angle φo and the roll rate φ0' which indicate the actual overturn (roll) tendency of the running vehicle and this estimation value A is set as the overturn parameter X which indicates the readiness of overturn of the vehicle in S140 in the present embodiment.

Accordingly, the present embodiment allows the overturn parameter X to be calculated as the value increasing/decreasing stepwise corresponding to the actual behavior (overturn behavior) of the vehicle and the readiness of overturn of the vehicle to be estimated accurately by the overturn parameter X.

That is, the present embodiment allows the readiness of overturn of the vehicle to be estimated accurately at quick timing steadily before the turning inner wheel (the wheel on the side of the steering direction in case of lane change running) floats because the overturn parameter X is calculated as the value increasing/decreasing stepwise corresponding to the actual behavior (overturn behavior) of the vehicle from the point of time before the turning inner wheel (the wheel on the side of the steering direction in case of lane change running) floats and the overturn parameter X is calculated as a value estimating the readiness of overturn (roll) of the vehicle, i.e., the possibility of the overturn (roll), to be always large (risk side).

Then, when the overturn parameter X is calculated by the process in S140, the process is shifted to S150.

It is judged in S150 whether or not the braking force applied to the front right wheel 22FR or the front left wheel 22FL at the present time is increased to prevent the overturn (roll) of the vehicle.

That is, it is judged whether or not the braking force applied to the front right wheel 22FR or the front left wheel 22FL has been increased and is now increased also at the present moment by the process (described later) of S180 or S190 unto the previous flow of the vehicle overturn preventing control process.

When it is judged in S150 that the braking force applied to the front right wheel 22FR or the front left wheel 22FL is not increased, the process is shifted to S160 to judge whether or not the overturn parameter X is greater than a first evaluation coefficient Ka (Ka>0) which is a predetermined value set in advance.

When it is judged in S160 that the overturn parameter X is greater than the first evaluation coefficient Ka, i.e., when it is judged that the vehicle is liable to overturn (roll), the process is shifted to S170 to judge whether or not the lateral acceleration Gy which is a detection value from the lateral acceleration sensor 41 is greater than 0.

Then, when it is judged in S170 that the lateral acceleration Gy is greater than 0, i.e., it is positive, the process is shifted to S180 to judge that the front wheel of the turning outer wheel side (the opposite side from the steering direction in case of the lane change running) is the front right wheel 22FR. Then, the ECU 20 drives the various actuators within the hydraulic circuit 50 so as to prevent the overturn (roll) by putting the vehicle running state into the under-steer tendency (or so as to reduce the overturn parameter X) to increase the braking force applied to the front right wheel 22FR, i.e., the brake hydraulic pressure applied to the wheel cylinder 51FR and then ends the vehicle overturn preventing control process once.

When it is judged in S170 that the lateral acceleration Gy is not greater than 0, i.e., it is negative for example, the process is shifted to S190 to judge that the front wheel of the turning outer wheel side (the opposite side from the steering direction in case of the lane change running) is the front left wheel 22FL. Then, the ECU 20 drives the various actuators within the hydraulic circuit 50 so as to prevent the overturn (roll) by putting the vehicle running state into the under-steer tendency (or so as to reduce the overturn parameter X) to increase the braking force applied to the front left wheel 22FL, i.e., the brake hydraulic pressure applied to the wheel cylinder 51FL and then ends the vehicle overturn preventing control process once.

Meanwhile, when it is judged in S160 that the overturn parameter X is not greater than the first evaluation coefficient Ka, there is no possibility of overturn (roll) of the vehicle. Then, it is judged that it is not necessary to increase the braking force of either one of the left and right front wheels 22FL and 22FR and the vehicle overturn preventing control process is ended once.

When it is judged in S150 that the braking force applied to the front right wheel 22FR or to the front left wheel 22FL at the present time is increased to prevent the overturn (roll) of the vehicle, the process is shifted to S200 to judge whether or not the overturn parameter X has become smaller than a second evaluation coefficient Kb (where, 0<Kb<Ka) which is a predetermined value set in advance.

When it is judged in S200 that the overturn parameter X has become smaller than the second evaluation coefficient Kb, it is judged that there is no possibility of the overturn (roll) of the vehicle. Then, the process is shifted to S210 to reduce the braking force which has been applied to the front right wheel 22FR or to the front left wheel 22FL. The vehicle overturn preventing control process is then ended once.

When it is judged in S200 that the overturn parameter X has not become smaller than the second evaluation coefficient Kb, it is judged that there remains the possibility of the overturn (roll) of the vehicle. Then, the increasing state of the braking force applied to the front right wheel 22FR or to the front left wheel 22FL is kept and the vehicle overturn preventing control process is ended once.

It is noted that the process in S120 corresponds to roll angle calculating means, the process in S130 corresponds to roll rate calculating means, the process in S140 corresponds to overturn parameter estimating means and the processes from S150 to S210 (the processes from S160 to S190 in particular) correspond to control means.

As described above, the maximum amplitude A (estimation value) before the damp of the roll angle $\phi(t)$ (behavior estimation value) is calculated by using the measured result of the roll angle $\phi 0$ and the roll rate $\phi 0'$ which indicate the actual overturn (roll) tendency of the running vehicle calculated (measured) in S120 and S130 based on the operational expression (3) derived from the physical model represented by the expression (4) describing the vehicle behavior (overturn behavior) based on the roll angle $\phi$ which indicates the overturn (roll) tendency of the running vehicle and the estimation value A is set as the overturn parameter X in the present embodiment (S140).

Accordingly, the present embodiment allows the overturn parameter X to be calculated as the value increasing/decreasing stepwise corresponding to the actual behavior (overturn behavior) of the vehicle and the readiness of overturn of the vehicle to be estimated accurately by the overturn parameter X.

That is, the present embodiment allows the readiness of overturn of the vehicle to be estimated accurately at quick timing steadily before the turning inner wheel (the wheel on the side of the steering direction in case of lane change running) floats because the overturn parameter X is calculated as the value increasing/decreasing stepwise corresponding to the actual behavior (overturn behavior) of the vehicle from the point of time before the turning inner wheel (the wheel on the side of the steering direction in case of lane change running) floats and the overturn parameter X is calculated as a value estimating the readiness of overturn (roll) of the vehicle, i.e., the possibility of the overturn (roll), to be always large (risk side).

Then, the present embodiment allows the overturn (roll) of the vehicle to be steadily prevented because the control for preventing the overturn (roll) of the vehicle is carried out (S150 through S210) based on the overturn parameter X thus estimated.

That is, because the present embodiment allows the readiness of overturn (roll) of the vehicle to be estimated accurately at quick timing steadily before the turning inner wheel (the wheel on the side of the steering direction in case of lane change running) floats as described above, the braking force may be applied to a predetermined wheel at fully quick timing (S180 and S190) even when a rock-back phenomenon occurs as the vehicle makes the lane change running for example and the overturn (roll) of the vehicle may be prevented steadily.

It is noted that although the roll angle $\phi 0$ was calculated (measured) by applying the lateral acceleration Gy which is a detection value from the lateral acceleration sensor 41 to the expression (1) at first (S120) and the roll angle $\phi 0$ was applied to the expression (2) to calculate the roll rate $\phi 0'$ (S130) in calculating (measuring) (S120, S130) the roll angle $\phi 0$ and the roll rate $\phi 0'$ used in calculating the overturn parameter X (S140) in the embodiment described above, it is possible to provide a roll rate sensor 44 instead of the lateral acceleration sensor 41 to measure the roll rate $\phi 0'$ of the vehicle by the roll rate sensor 44 and then to apply the roll rate $\phi 0'$ which is the detection value from the roll rate sensor 44 to a physical model (Laplace transformed model) describing the relationship between the roll rate $\phi 0'$ and the roll angle $\phi 0$ of the vehicle represented by the following expression (7) to calculate (measure) the roll angle $\phi 0$:

$$\phi 0 = \frac{K3}{s+K4} \cdot \phi 0' \tag{7}$$

(where, K3 and K4: constant)

It is noted that the roll rate sensor 44 of this time corresponds to roll rate measuring means and the roll angle $\phi 0$ calculating (measuring) process carried out by the ECU 20 by using the expression (7) corresponds to roll angle calculating means.

In this mode, the process corresponding to S170 carried out to judge which of the front left wheel 22FL and the front right wheel 22FR is the front wheel on the turning outer wheel side of the vehicle (on the opposite side from the steering direction in case of the lane change running) may be carried out by judging whether or not the roll rate $\phi 0'$ is greater than zero.

In concrete, when it is judged that the roll rate $\phi 0'$ is greater than zero, i.e., that it is positive, the front wheel of the turning outer wheel side (the wheel on the opposite side from the steering direction in case of the lane change running) may be judged to be the front right wheel 22FR, so that the process is shifted to S180. When it is judged that the roll rate $\phi 0'$ is not greater than zero, i.e., that it is negative, the front wheel on the side of the turning outer wheel (the wheel on the opposite side from the steering direction in case of the lane change running) may be judged to be the front left wheel 22FL, so that the process is shifted to S190.

It is noted that when the lateral acceleration sensor 41 is provided similarly to the embodiment described above in addition to the roll rate sensor 44, the process of S170 may be carried out in the same manner with the embodiment described above.

[Second Embodiment]

A second embodiment will be explained next.

An explanation of the parts which are the same with those in the first embodiment will be omitted or simplified here.

Figure 4:
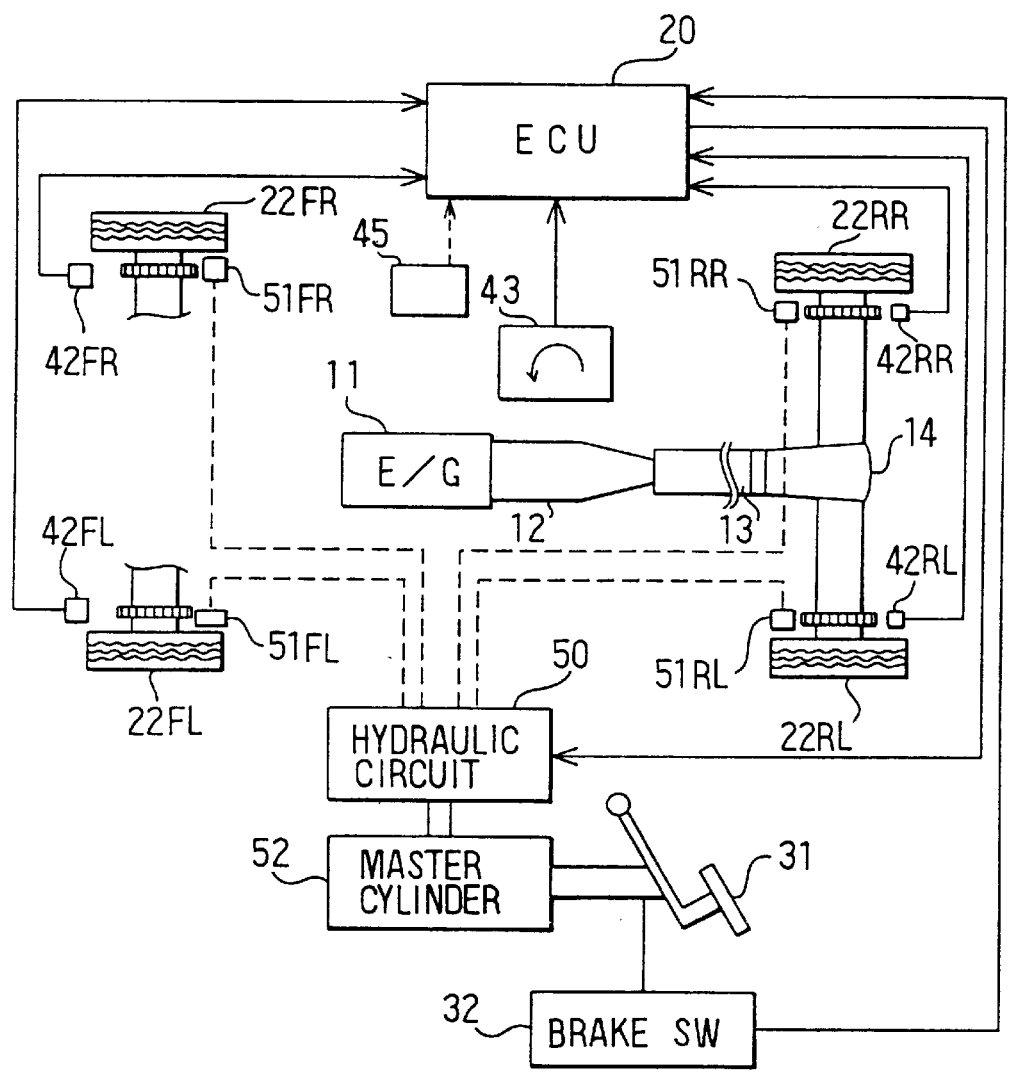
FIG. 4 is a schematic structural view showing the whole structure of a vehicle behavior control system according to the second embodiment.

FIG. 4 is a schematic structural view showing the whole structure of a vehicle behavior control system according to another embodiment (second embodiment) to which the invention is applied.

According to the second embodiment, wheel speed sensors 42FL, 42FR, 42RL and 42RR for detecting revolution speed (hereinafter refereed to also as wheel speed) of the respective wheels 22FL through 22RR are provided to the respective wheels 22FL through 22RR of the vehicle and the vehicle is provided with a the yaw rate sensor 43 as yaw rate measuring means instead of the lateral acceleration sensor 41 in the first embodiment.

Detection signals from the wheel speed sensors 42FL through 42RR and the yaw rate sensor 43 are inputted to the ECU 20 together with the detection signal from a the brake switch 32. It is noted that the brake switch 32 is a switch which turns ON when the brake pedal 31 is stepped on and lights up a stop lamp (not shown).

Next, the vehicle overturn preventing control process (vehicle behavior controlling process) of the present embodiment which is repeatedly executed by the ECU 20 while running the vehicle (after when the ignition switch of the vehicle (not shown) is turned ON in concrete) will be explained along flowcharts shown in FIGS. 5 through 7.

Figure 5:
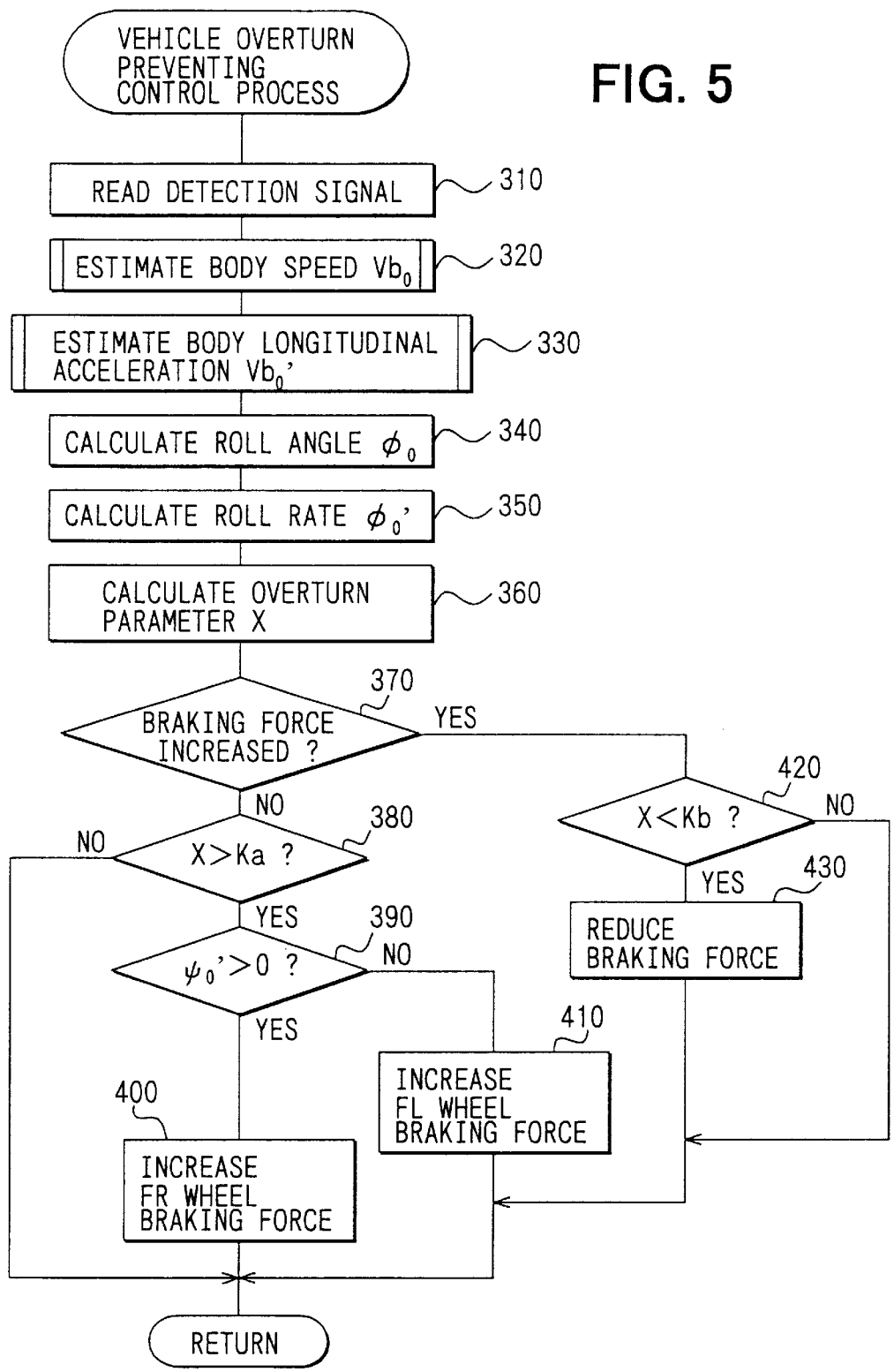
FIG. 5 is a flowchart showing a vehicle overturn preventing control process executed in an electronic control unit (ECU) in the second embodiment.

When the vehicle overturn preventing control process is started as shown in FIG. 5, the ECU 20 reads the detection signals from the wheel speed sensors 42FL through 42RR, the yaw rate sensor 43 and the brake switch 32 in S310 which corresponds to the process of S110 of the first embodiment. Then, a body speed estimating process is executed in S320.

Figure 6:
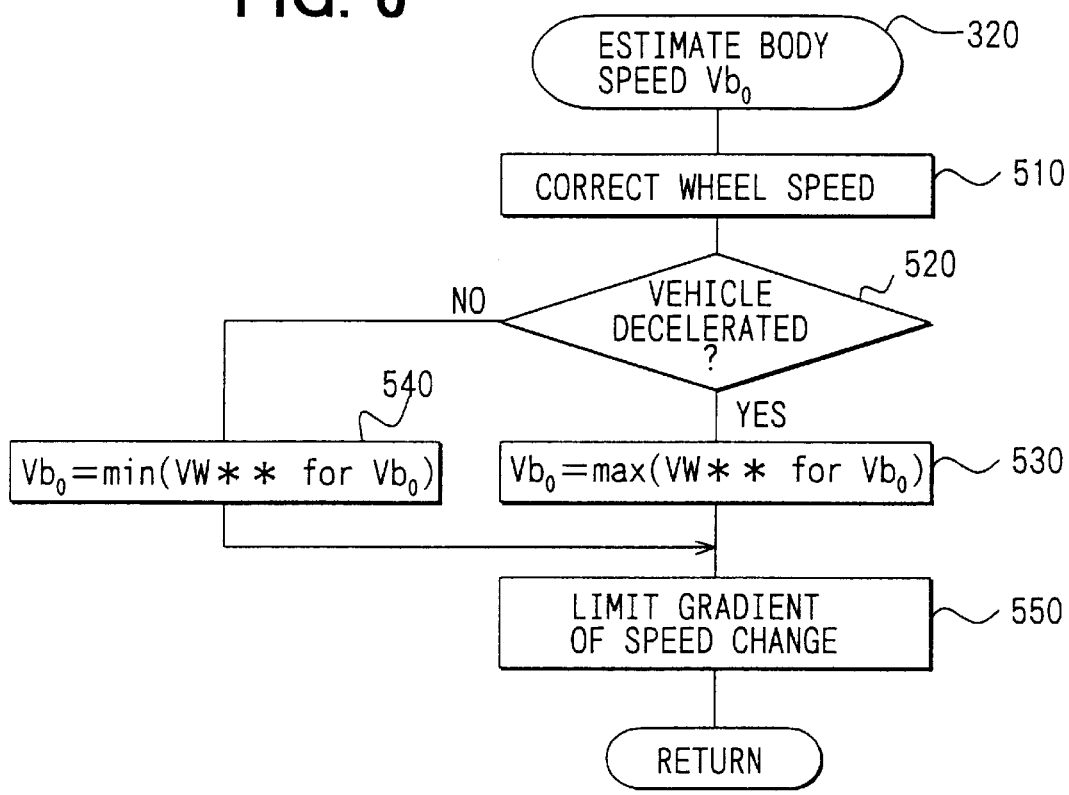
FIG. 6 is a flowchart showing a body speed estimating process executed in S320 in FIG. 5.

This body speed estimating process is a process for estimating (measuring) body speed Vbo of the vehicle based on the detection signals read in S310 and is executed as shown in FIG. 6.

That is, the ECU 20 carries out a corrective arithmetic operation of the wheel speed of the respective wheels 22FL through 22RR in S510. In concrete, the corrective arithmetic operation for converting the wheel speeds VWFLo, VWFRo, VWRLo and $VWRR_0$ of the respective wheels 22FL through 22RR detected from the input signals from the wheel speed sensors 42FL through 42RR into the speed of gravity center position of the vehicle by using the following expressions (8) through (11) using the yaw rate $\phi$o' of the vehicle detected from the input signal from the yaw rate sensor 43:

$$VWFLo \text{ for } Vbo = VWFLo - Lf \times \phi o' \quad (8)$$

$$VWFRo \text{ for } Vbo = VWFRo - Lf \times \phi o' \quad (9)$$

$$VWRLo \text{ for } Vbo = VWRLo - Lf \times \phi o' \quad (10)$$

$$VWRRo \text{ for } Vbo = VWRRo - Lf \times \phi o' \quad (11)$$

It is noted that among the parameters in the expressions (8) through (11), VWFLo for Vbo, VWFRo for Vbo, VWRLo for Vbo and VWRR for Vbo denote the wheel speed after the correction of the respective wheels 22FL through 22RR. Lf denotes the shortest distance from the center of gravity of the vehicle to a front shaft (front drive shaft) and Lr denotes the shortest distance from the center of gravity of the vehicle to a rear shaft (rear drive shaft). The yaw rate $\phi$o' which is a detection value from the yaw rate sensor 43 is outputted as a positive value during left turn (auto-rotation) and as a negative value during right turn (auto-rotation) in the present embodiment.

Next, it is judged whether or not the vehicle is now decelerating. This judgment is carried out by judging whether or not the input signal from the brake switch 32 is ON state in S520.

When it is judged that the vehicle is decelerating in S520, the process is shifted to S530 to calculate the body speed Vbo (estimation value) by the following expression:

$$Vbo = \max(VW^{**} \text{ for } Vbo) \quad (12)$$

It is noted that among the parameters in the expression (12), VW for Vbo denotes the wheel speed after the correction of all wheels calculated by the expressions (8) through (11) and  denotes the respective wheels 22FL through 22RR. The expression (12) shows that the maximum wheel speed among the wheel speeds of all wheels after the correction is calculated as the body speed Vbo.

That is, when the vehicle is decelerating, there is a possibility that the action of the brake to the respective wheels 22FL through 22RR or the action of the engine brake to the respective wheels 22FL through 22RR causes the wheels to get into deceleration slip and that the wheel speed (wheel speed after correction) of the wheel which gets into the deceleration slip becomes extremely small as compared to the body speed.

Then, the maximum wheel speed corresponding to the wheel speed of the wheels which are not get into the deceleration slip (in other words, the wheels gripped to the road surface) after the correction among the wheel speeds of all wheels after the correction is calculated as the body speed Vbo in S530.

Meanwhile, when it is judged in S520 that the vehicle is not decelerating, the process is shifted to S540 to calculate the body speed Vbo (estimation value) by the following expression:

$$Vbo = \min(VW^{**} \text{ for } Vbo) \quad (13)$$

The expression (13) shows that the minimum wheel speed among the wheel speeds of all wheels after the correction is calculated as the body speed Vbo.

That is, a case when the vehicle is accelerating may be considered as the case when the vehicle is not in the deceleration state. There is a possibility that the wheel speed of the wheel which gets into an acceleration slip (wheel speed after the correction) may become extremely large as compared to the body speed.

Then, the minimum wheel speed corresponding to the wheel speed of the wheels which are not get into the acceleration slip (in other words, the wheels gripped to the road surface) after the correction among the wheel speeds of all wheels after the correction is calculated as the body speed Vbo in S540.

When the body speed Vbo is calculated in S530 or in S540, the process is shifted to S550.

The gradient of change of the body speed Vbo calculated as described above is limited in S550. Then, the body speed estimating process is ended.

That is, in S550, the body speed Vbo calculated in the present flow is corrected by limiting the variation from the body speed calculated in the previous flow to the body speed calculated in the present flow corresponding to the body longitudinal acceleration Vbo' which is acceleration in the longitudinal axis direction of the body calculated as an estimation value in the process (described later) of S330 in the previous flow.

When the body speed Vbo is estimated (measured) by the body speed estimating process (S320), the body longitudinal acceleration estimating process is executed in S330 (see FIG. 5) this time.

Figure 7:
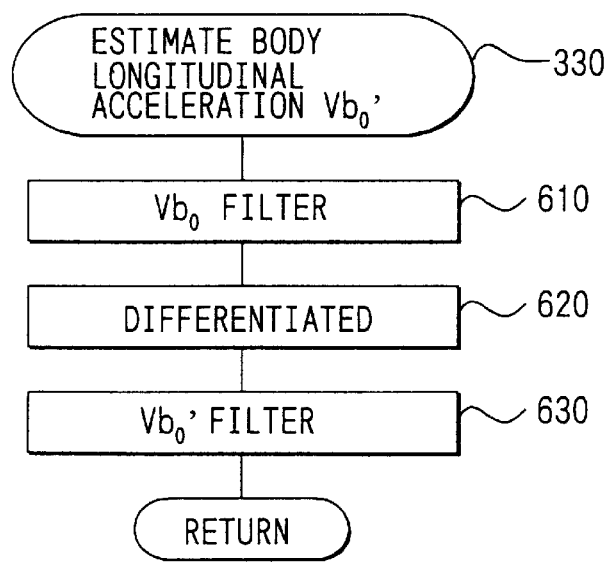
FIG. 7 is a flowchart showing a body longitudinal acceleration estimating process executed in S330 in FIG. 5.

The body longitudinal acceleration estimating process is a process for calculating the body longitudinal acceleration Vbo' (estimation value) in the present flow and is executed as shown in FIG. 7.

That is, in the body longitudinal acceleration estimating process, the body speed Vbo calculated in the body speed estimating process (S320) within a predetermined time till the present flow is filtered by a low-pass filter in S610 at first. In concrete, noise within the body speed Vbo as the estimation value is removed by using the low-pass filter which transmits only frequency of 10 Hz or less.

Next, the body speed Vbo filtered in S610 is differentiated in S620.

The value calculated in S620, i.e., the body longitudinal acceleration Vbo', is filtered in S630. Then, the body longitudinal acceleration estimating process is ended. In concrete, the vbo' calculated in S620 is applied to the low-pass filter which transmits only frequency of 2 Hz or less.

When the vbo' (estimation value) in the present flow is thus calculated by the body longitudinal acceleration estimating process (S330), the process is shifted to S340 (see FIG. 5) which corresponds to the process of S120 in the first embodiment.

In S340, the yaw rate φo' of the vehicle detected from the input signal from the yaw rate sensor 43 and the body speed Vbo estimated (measured) by the body speed estimating process (S320) are applied to a physical model (Laplace transformed model) describing the relationship between the yaw rate φo', the body speed Vbo and the roll angle φ0 of the vehicle represented by the following expression (14) to calculate the roll angle φ0.

$$\phi 0 = \frac{1}{J \cdot s^2 + D \cdot s + K} \cdot \frac{W \cdot h}{g} \cdot Vbo \cdot \varphi 0' \qquad (14)$$

(where, J: roll inertia, D: damper constant, K: spring constant, W: weight of vehicle, h: height of center of gravity of vehicle, g: gravitational acceleration)

Next, the roll angle φ0 calculated in S340 is applied to the expression (2) to differentiate and to calculate the roll rate φ0' of the vehicle in S350 which corresponds to the process of S130 in the first embodiment.

Next, in S360 which corresponds to the process of S140 in the first embodiment, the estimation value A of the maximum amplitude of the behavior estimation value φ(t) of the roll angle φ is calculated by using the measured result of the roll angle φ0 and the roll rate φ0' indicating the actual overturn (roll) tendency of the running vehicle calculated (measured) in S340 and S350 based on the expression (3) and this estimation value A is set as the overturn parameter X which indicates the readiness of overturn of the vehicle.

When the overturn parameter X is calculated in the process of S360, the process is then shifted to S370.

Here, the respective processes in S370 through S430 correspond to the respective processes in S150 through S210 in the first embodiment and are executed substantially in the same manner with the processes in S150 through S210 except of the process in S390 (which corresponds to the process in S170 in the first embodiment).

Although the process in S390 is carried out to judge whether the front wheel on the side of the turning outer wheel of the vehicle (the wheel on the side opposite from the steering direction in case of the lane change running) is the front left wheel 22FL or the front right wheel 22FR similarly to the process in S170 in the first embodiment, it is judged whether the front wheel on the side of the turning outer wheel of the vehicle (the wheel on the side opposite from the steering direction in case of the lane change running) is the front left wheel 22FL or the front right wheel 22FR by judging whether or not the yaw rate φo' which is a detection value from the yaw rate sensor 43 is greater than zero in S390 because the vehicle is not provided with the lateral acceleration sensor 41 in the present embodiment, differing from the first embodiment.

In concrete, when it is judged that the yaw rate φo' is greater than zero, i.e., it is positive, it may be judged that the front wheel on the side of the turning outer wheel of the vehicle (the wheel on the side opposite from the steering direction in case of the lane change running) is the front right wheel 22FR. Then, the process is shifted to S400 (which corresponds to the process in S180 in the first embodiment). When it is judged that the roll angle φ0 is not greater than zero, i.e., it is negative, for example, it may be judged that the front wheel on the side of the turning outer wheel of the vehicle (the wheel on the side opposite from the steering direction in case of the lane change running) is the front left wheel 22FL. Then, the process is shifted to S410 (which corresponds to the process in S190 in the first embodiment).

It is noted that the process in S320 corresponds to body speed measuring means, the process in S340 corresponds to roll angle calculating means, the process in S350 corresponds to roll rate calculating means, the process in S360 corresponds to overturn parameter estimating means similarly to the process in S140 in the first embodiment, and the processes in S370 through S430 (the processes in S380 through S410 in particular) correspond to control means similarly to the processes in S150 through S210 (the processes in S160 through S190 in particular) in the first embodiment.

As described above, the maximum amplitude A (estimation value) before the damp of the roll angle φ(t) (behavior estimation value) is calculated by using the measured result of the roll angle φ0 and the roll rate φ0' which indicate the actual overturn (roll) tendency of the running vehicle calculated (measured) in S340 and S350 based on the operational expression (3) derived from the physical model represented by the expression (4) describing the vehicle behavior (overturn behavior) based on the roll angle φ which indicates the overturn (roll) tendency of the running vehicle and the estimation value A is set as the overturn parameter X in the present embodiment. (S360)

Accordingly, the present embodiment allows the overturn parameter X to be calculated as the value increasing/decreasing stepwise corresponding to the actual behavior (overturn behavior) of the vehicle and the readiness of overturn of the vehicle to be estimated accurately by the overturn parameter X.

That is, the present embodiment allows the readiness of overturn of the vehicle to be estimated accurately at quick timing steadily before the turning inner wheel (the wheel on the side of the steering direction in case of lane change running) floats because the overturn parameter X is calculated as the value increasing/decreasing stepwise corresponding to the actual behavior (overturn behavior) of the vehicle from the point of time before the turning inner wheel (the wheel on the side of the steering direction in case of lane change running) floats and the overturn parameter X is calculated as a value estimating the readiness of overturn (roll) of the vehicle, i.e., the possibility of the overturn (roll), to be always large (risk side).

Then, the present embodiment allows the overturn (roll) of the vehicle to be steadily prevented because the control for preventing the overturn (roll) of the vehicle is carried out (S370 through S430) similarly to the first embodiment based on the overturn parameter X thus estimated in S360.

That is, because the present embodiment allows the readiness of overturn (roll) of the vehicle to be estimated accurately at quick timing steadily before the turning inner wheel (the wheel on the side of the steering direction in case of lane change running) floats similarly to the first embodiment, the braking force may be applied to a predetermined wheel at fully quick timing (S400 and S410) even when the rock-back phenomenon occurs as the vehicle makes the lane change running for example and the overturn (roll) of the vehicle may be prevented steadily.

It is noted that although the expressions (8) through (11) using the yaw rate φo' of the vehicle were used in converting (S510) the wheel speeds VWFLo through VWRRo into the speed of position of center of gravity of the vehicle in the body speed estimating process (S320), the yaw rate φo' in the expression (8) through (11) may be calculated as a conversion value φo'H by the following expression (15) using the lateral acceleration Gy detected by the input signal from the lateral acceleration sensor 41 when the vehicle is provided with the lateral acceleration sensor 41:

$$\phi o' H = Gy / Vb_{(n-1)} \qquad (15)$$

It is noted that in the expression (15), $Vb_{(n-1)}$ is the body speed Vbo calculated in the previous flow. When the vehicle is running at extremely low speed (when the vehicle is running at extremely low speed which is below the limit of resolution of the wheel speed sensors 42FL through 42RR like 5 km/h or less for example), φoH' may be calculated by substituting a fixed value, e.g., 5 km/h, to $Vb_{(n-1)}$ in order not to compute by zeroing $Vb_{(n-1)}$ in the expression (15) in the mode using the expression (15).

Further, although the judgment has been made by using the input signal from the brake switch 32 in judging (S520) whether the vehicle is in the deceleration state in the body speed estimating process (S320) in the embodiment described above (second embodiment), one of the following three modes (1) through (3) may be adopted for example. It is also possible to adopt a mode in which at least two of the following three modes (1) through (3) and the mode of the embodiment described above, i.e., the mode of using the input signal from the brake switch 32:

(1) Judge whether the vehicle is in the deceleration state by judging whether the body longitudinal acceleration Vbo' (value calculated in the previous flow) calculated in the body longitudinal acceleration estimating process (S330) is positive or negative;

(2) Judge whether the vehicle is in the deceleration state by detecting an IDL (idling) signal, e.g., a signal whose output changes depending whether the accelerator pedal (not shown) is stepped down, by the ECU 20; and (3) Judge whether the vehicle is in the deceleration state by judging whether or not a detection value (pressure) of a master cylinder pressure sensor provided to detect pressure within the master cylinder 52 is at the reference value or more and wheel braking force is generated substantially. It is noted that at least one of the third and fourth pressure sensors 77 and 78 (see FIG. 2) for example may be functioned as the master cylinder pressure sensor.

Meanwhile, as for the process for measuring (estimating) the body speed Vbo (which corresponds to body speed measuring means in claim 11), an average value (average driven wheel speed) of revolution speeds of the right and left driven wheels obtained from wheel speed sensors for detecting the wheel speed of the left and right driven wheels (the front wheels 22FL and 22FR in case of the front-engine and rear-drive type vehicle like the one in the above embodiments (first and second embodiments) may be detected as the body speed Vbo(estimation value).

Further, although the yaw rate φo' which is the detection value from the yaw rate sensor 43 and the body speed Vbo estimated (measured) in the body speed estimating process (S320) have been applied to the expression (14) to calculate (measure) the roll angle φ0 (S340) and the roll angle φ0 is applied to the expression (2) to calculate (measure) the roll rate φ0' (S350) in calculating (measuring) (S340, S350) the roll angle φ0 and the roll rate φ0' used in calculating the overturn parameter X (S360) in the embodiment described above (second embodiment), a steering angle δo in steering the vehicle may be measured by a steering angle sensor when it is provided in the vehicle and the body speed Vbo may be estimated (measured) in the same manner with the second embodiment, the steering angle δo and the body speed Vbo may be applied to a physical model (Laplace transformed model) describing the relationship between the steering angle δo, the body speed Vbo and the roll angle φ0 of the vehicle represented by the following expression (16) to calculate (measure) the roll angle φ0 and the roll angle φ0 may be applied to the expression (2) to calculate (measure) the roll rate φ0':

$$\phi 0 = \frac{K5}{s + K6} \cdot \frac{Vbo^2}{1 + K7 \cdot Vbo^2} \cdot \tan(\delta o) \quad (16)$$

(where, K5, K6 and K7: constant)

It is noted that the steering angle sensor in this case corresponds to steering angle measuring means, the process for estimating (measuring) the body speed Vbo in the same manner with the second embodiment corresponds to body speed measuring means, the process for calculating (measuring) the roll angle φ0 carried out by the ECU 20 by using the expression (16) corresponds to roll angle calculating means and the process for calculating (measuring) the roll rate φ0' by applying the roll angle φ0 to the expression (2) corresponds to roll rate calculating means.

The steering angle δo which is a detection value from the steering angle sensor is outputted as a positive value in steering to left and as a negative value in steering to right.

Then, the process corresponding to S390 carried out to judge which one of the left and right front wheels 22FL and 22FR is the front wheel on the side of the turning outer wheel of the vehicle (the wheel on the opposite side from the steering direction in case of lane change running) may be carried out by judging whether the steering angle δo is greater than zero in this mode.

In concrete, when the steering angle δo is judged to be greater than zero, i.e., to be positive, the front right wheel 22FR may be judged to be the front wheel on the side of the turning outer wheel of the vehicle (the wheel on the opposite side from the steering direction in case of lane change running). Then, the process shifts to S400. When the steering angle δo is judged to be not greater than zero, i.e., to be negative, the front left wheel 22FL may be judged to be the front wheel on the side of the turning outer wheel of the vehicle (the wheel on the opposite side from the steering direction in case of lane change running). Then, the process is shifted to S410.

Then, the overturn parameter X may be calculated in the same manner with the second embodiment and the overturn (roll) of the vehicle may be also prevented reliably without using the yaw rate sensor 43 by arranging the process corresponding to S390 as one using the steering angle δo and by arranging the process for measuring (estimating) the body speed Vbo (which corresponds to body speed measuring means in claim 12) as one measuring the average driven wheel speed as the body speed Vbo.

That is, the roll angle φ 0 and the roll rate φ0' of the running vehicle used in calculating the overturn parameter X may be calculated (measured) and the overturn (roll) of the vehicle may be also prevented reliably without the yaw rate sensor 43 by using only the detection values from the wheel speed sensors (the wheel speed sensors 42FL and 42FR provided respectively to the front wheels 25FL and 25FL which are driven wheels in case of the front-engine and rear-driven type vehicle like the one in the embodiments described above) and the steering sensor 45.

It is also possible to calculate (measure) the roll angle φ0 and the roll rate φ0' of the running vehicle used in calculating the overturn parameter X by using only the wheel speeds VWFLo through VWRRo which are detection values from the wheel speed sensors 42FL through 42RR provided respectively to the respective wheels 22FL through 22RR.

That is, the wheel speeds VWFLo through VWRRo of the respective wheels 22FL through 22RR are measured by the wheel speed sensors 42FL through 42RR and are applied to a physical model (Laplace transformed model) which is represented by the following expression (18) and which describes the relationship between the difference of speed pT of inner and outer turning wheels defined by the following expression (17) and the roll angle $\phi 0$ of the vehicle to calculate (measure) the roll angle $\phi 0$:

$$pT = (VWFRo + VWRRo) - (VWFLo + VWRLo) \tag{17}$$

$$\phi o = \frac{K8}{s + K9} \cdot pT \tag{18}$$

(where, K8 and K9: constant)

Then, the roll angle $\phi 0$ is applied to the expression (2) to calculate (measure) the roll rate $\phi 0'$.

It is noted that the wheel speed sensors 42FL through 42RR in this case corresponds to wheel speed measuring means and the process for calculating (measuring) the roll angle $\phi 0$ corresponds to roll angle calculating means and the process for calculating (measuring) the roll rate $\phi 0'$ by applying the roll angle $\phi 0$ corresponds to roll rate calculating means.

In this mode, the process corresponding to S390 carried out to judge whether the front wheel 22FL or 22FR is the front wheel on the side of the turning outer wheel of the vehicle (the wheel on the opposite side from the steering direction in case of lane change running) may be carried out by judging whether or not the difference of speed pT of the turning inner and outer wheels is greater than zero.

In concrete, when the difference of speed pT of the turning inner and outer wheels is judged to be greater than zero, i.e., to be positive, the right front wheel 22FR may be judged to be the front wheel of on the side of the turning outer wheel of the vehicle (the wheel on the opposite side from the steering direction in case of lane change running) Then, the process is shifted to S400. When the difference of speed pT of the turning inner and outer wheels is judged to be not greater than zero, i. e., to be negative, in contrary, the left front wheel 22FL may be judged to be the front wheel of on the side of the turning outer wheel of the vehicle (the wheel on the opposite side from the steering direction in case of lane change running). Then, the process is shifted to S410.

Such arrangement allows the roll angle $\phi 0$ and the roll rate $\phi 0'$ of the running vehicle used in calculating the overturn parameter X to be calculated (measured) and allows to prevent the overturn (roll) of the vehicle reliably without the yaw rate sensor 43 by using only the detection values from the wheel speed sensors 42FL through 42RR.

While the embodiments of the invention have been described above, the invention is not limited to those embodiments (first and second embodiments) and may take various modes.

For instance, although the above embodiments (first and second embodiments) have been explained about the case in which the invention is applied to the front-engine and rear-drive (FR) type vehicle (that is, a rear-wheel drive car), the same effects with the above embodiments (first and second embodiments) may be obtained even when the invention is applied to a front-engine and front-drive (FF) type vehicle (that is, a front-wheel drive car).

Further, although the maximum amplitude A (estimation value) of the roll angle $\phi(t)$ (behavior evaluation value) before the damp has been calculated as the overturn parameter X based on the expression (3) in the above embodiments (first and second embodiments), an operational expression for estimating the behavior of the roll angle $\phi$ derived from the physical model describing the behavior of the vehicle (overturn behavior) in running the vehicle based on the roll angle $\phi$ indicating the overturn (roll) tendency of the running vehicle may be set as an operational expression for calculating the overturn parameter X and a behavior estimation value $\phi(t)$ of the roll angle $\phi$ after an elapse of time t maybe calculated based on the operational expression to set the estimation value $\phi(t)$ as the overturn parameter X.

In this case, the operational expression for estimating the behavior of the roll angle $\phi$ may be represented by the expression (6) as described above by using the lateral acceleration Gy which is a detection value from the lateral acceleration sensor 41 and the overturn parameter X may be calculated based on this expression (6) in the mode in which the vehicle is provided with the lateral acceleration sensor 41 like the first embodiment.

The operational expression for estimating the behavior of the roll angle $\phi$ may be also represented by the expression (19) by using the roll rate $\phi 0'$ which is a detection value from the roll rate sensor 44 and the overturn parameter X may be calculated based on this expression (19) in the mode in which the lateral acceleration sensor 41 is removed out of the vehicle in the first embodiment (that is, the vehicle which is provided with the lateral acceleration sensor 41) and in which the roll rate sensor 44 is provided instead. It is noted that the roll angle $\phi 0$ in the expression (19) is calculated by applying the roll rate $\phi 0'$ which is a detection value from the roll rate sensor 44 to the expression (7):

$$\phi(t) = A \cdot e^{-\frac{Pt}{2}} \sin(w \cdot t + \theta) + \phi o \tag{19}$$

The operational expression for estimating the behavior of the roll angle $\phi$ may be represented by the following expression (20) by using the yaw rate $\phi o'$ which is a detection value from the yaw rate sensor 43 and the body speed vbo which is estimated (measured) by the body speed estimating process (which corresponds to body speed measuring means in claim 11) and the overturn parameter X may be calculated based on this expression (20) in the mode in which the vehicle is provided with the yaw rate sensor 43 and the wheel speed sensors 42FL through 42RR:

$$\phi(t) = A \cdot e^{-\frac{Pt}{2}} \cdot \sin(w \cdot t + \theta) + \frac{W \cdot h}{g \cdot K} \cdot Vbo \cdot \varphi o' \tag{20}$$

The operational expression for estimating the behavior of the roll angle $\phi$ may be also represented by the following expression (21) by using the steering angle $\delta o$ which is a detection value from the steering angle sensor and the body speed Vbo which is estimated (measured) by the body speed estimating process (which corresponds to body speed measuring means) and the overturn parameter X may be calculated based on this expression (21) in the mode in which the yaw rate sensor 43 is removed out of the vehicle in the second embodiment, i.e., the vehicle provided with the yaw rate sensor 43 and the wheel speed sensors 42FL through 42RR) and the steering sensor 45 is provided instead:

The operational expression for estimating the behavior of the roll angle $\phi$ may be also represented by the following expression (22) by using the difference of speed of turning inner and outer wheels pT which is calculated by the expression (17) by using the wheel speeds VWFLo through VWRRo which are detection values from the wheel speed sensors 42FL through 42RR and the overturn parameter X may be calculated based on this expression (22) in the mode in which the yaw rate sensor 43 is removed out of the vehicle in the second embodiment, i.e., the vehicle provided with the yaw rate sensor 43 and the wheel speed sensors 42FL through 42RR):

$$\phi(t) = A \cdot e^{-\frac{Pt}{2}} \cdot \sin(w \cdot t + \theta) + \frac{K5}{s+K6} \cdot \frac{Vbo^2}{1+K7 \cdot Vbo^2} \cdot \tan(\delta o) \quad (21)$$

As a concrete mode for calculating the overturn parameter X, i.e., φ(t), based on any one of the operational expressions (6) and (19) through (22), the estimation value φ($t_0$) of the roll angle φ after an elapse of predetermined time to, e.g., $t_0$=0.2 sec., in which the delay of control in controlling the behavior of vehicle (that is, in carrying out the processes corresponding to S150 through S210 or S370 through S430 in making the control for preventing the overturn (roll) of the vehicle) is taken into account maybe calculated based on any one of the operational expressions (6) and (19) through (22) to set the estimation value φ($t_0$) as the overturn parameter X.

$$\phi(t) = A \cdot e^{-\frac{Pt}{2}} \cdot \sin(w \cdot t + \theta) + \frac{K8}{s+K9} \cdot pT \quad (22)$$

That is, because the control of delay occurs by the predetermined time $t_0$ in the control system until when the various actuators within the hydraulic circuit 50 are driven and the braking force applied to a predetermined wheel (the front right wheel 22FR or the front left wheel 22FL) is effectively increased since when it has been judged that the possibility of overturn of the vehicle is high by the process corresponding to S160 or S380 by using the overturn parameter X for example in making the control for actually preventing the overturn (roll) of the vehicle based on the overturn parameter X, i.e., φ($t_0$) thus calculated, the estimation value φ($t_0$) of the roll angle φ after the elapse of the predetermined time $t_0$ in which this delay of control is taken into account is calculated as the overturn parameter X.

It then allows the estimation value φ($t_0$) of the roll angle φ at the point of time when the braking force to be applied to the predetermined wheel (the front right wheel 22FR or the front left wheel 22FL) is effectively increased is calculated as the overturn parameter X and allows the readiness of overturn (roll) of the vehicle to be estimated accurately at quick timing reliably before the turning inner wheel (the wheel on the side of the steering direction in case of lane change running) floats.

The vehicle overturn preventing control (vehicle behavior control) may be made adequately corresponding to the actual behavior of the vehicle (overturn behavior) during control by making the vehicle overturn preventing control (vehicle behavior control) based on the overturn parameter X thus calculated.

It is noted that the process of calculating the estimation value φ($t_0$) of the roll angle φ after the elapse of the predetermined time to in which the delay of control in controlling the behavior of the vehicle is calculated based on any one of the operational expressions (6) and (19) through (22) to set the estimation value φ($t_0$) as the overturn parameter X corresponds to overturn parameter estimating means.

Meanwhile, as another concrete mode for calculating the overturn parameter X, i.e., φ(t), based on any one of the operational expressions (6) and (19) through (22), the estimation value φ($t_x$) of the roll angle φ after the elapse of time $t_x$ until when the estimation value φ(t) of the roll angle φ becomes maximum next from the present time for example may be calculated based on any one of the operational expressions (6) and (19) through (22) to set this estimation value φ($t_x$) as the overturn parameter X.

That is, as it is apparent in the operational expressions (6) and (19) through (22), the behavior estimation value φ(t) of the roll angle φ is represented as what damp-oscillates, so that the time $t_x$ until when the resonance element sin (w·t+θ) of this behavior estimation value φ(t) becomes 1 or −1 next, i.e., the estimation value φ($t_x$) of the roll angle φ after the elapse of the least time t satisfying the following expression, is calculated as the overturn parameter X:

$$w \cdot t + \theta = \frac{\pi}{2} \cdot (1 + 2 \cdot n) \quad (23)$$

(where, n is an integer greater than zero)

It then allows the readiness of overturn (roll) of vehicle to be estimated accurately at quick timing reliably before the turning inner wheel (the wheel on the side of the steering side in case of lane change running) floats because the overturn parameter X, i.e., φ(t), is calculated as a value estimating the readiness of overturn (roll) of the vehicle, i.e., the possibility of overturn (roll), always to maximum (risk side).

It is noted that the process of calculating the estimation value φ($t_x$) of the roll angle φ after the elapse of the time $t_x$ until when the behavior estimation value φ(t) of the roll angle φ is maximized next from the present time body speeded on any one of the operational expressions (6) and (19) through (22) and of setting this estimation value φ($t_x$) as the overturn parameter X corresponds to overturn parameter estimating means.

Then, when the estimation value φ($t_0$) or φ($t_x$) of the roll angle φ is calculated as the overturn parameter X as described above, a concrete mode of a process corresponding to S160 or S380 carried out to judge whether or not the possibility of overturn (roll) of the vehicle is high may be carried out by judging whether or not an absolute value of the estimation value φ($t_0$) or φ($t_x$) which is the overturn parameter X is greater than a first evaluation coefficient Ka' which is set in advance corresponding to the overturn parameter X of this time.

A concrete mode of a process corresponding to S200 or S420 carried out to judge whether or not the possibility of overturn (roll) of the vehicle is eliminated may be carried out by judging whether or not the absolute value of the estimation value φ($t_0$) or φ($t_x$) which is the overturn parameter X for example is smaller than a second evaluation coefficient Kb' which is set in advance corresponding to the overturn parameter X of this case.

Meanwhile, the concrete mode of adding the braking force to the predetermined wheel to prevent the overturn (roll) of the vehicle when it is judged that the overturn parameter X is greater than the first evaluation coefficient Ka (or Ka'), i.e., that the possibility of overturn (roll) of the vehicle is high, in the process corresponding to S160 or S380, is not limited only to adding the braking force to the front wheel on the side of the turning outer wheel of the vehicle (in other words, the opposite side from the steering direction). That is, the braking force may be applied also to the front and rear wheels on the side of the turning outer wheel (in other words, on the opposite side from the steering direction).

It is also possible to prevent the overturn (roll) by dropping the vehicle running speed (body speed) by adding the braking force to the both front wheels or to all of the wheels.

Next, an exemplary experiment which supports the effects of the embodiments (first and second embodiments) described above will be explained.

[Exemplary Experiment]

In this experiment, it was verified whether it is possible to reliably prevent the experimental vehicle from overturning (rolling) based on the overturn parameter X calculated based on the operational expression (3) when the experimental vehicle provided with the vehicle behavior control system similar to the one in the second embodiment and with the steering sensor 45 was caused to make the lane change running.

The result of this experiment will be explained by using FIG. 8.

Figure 8:
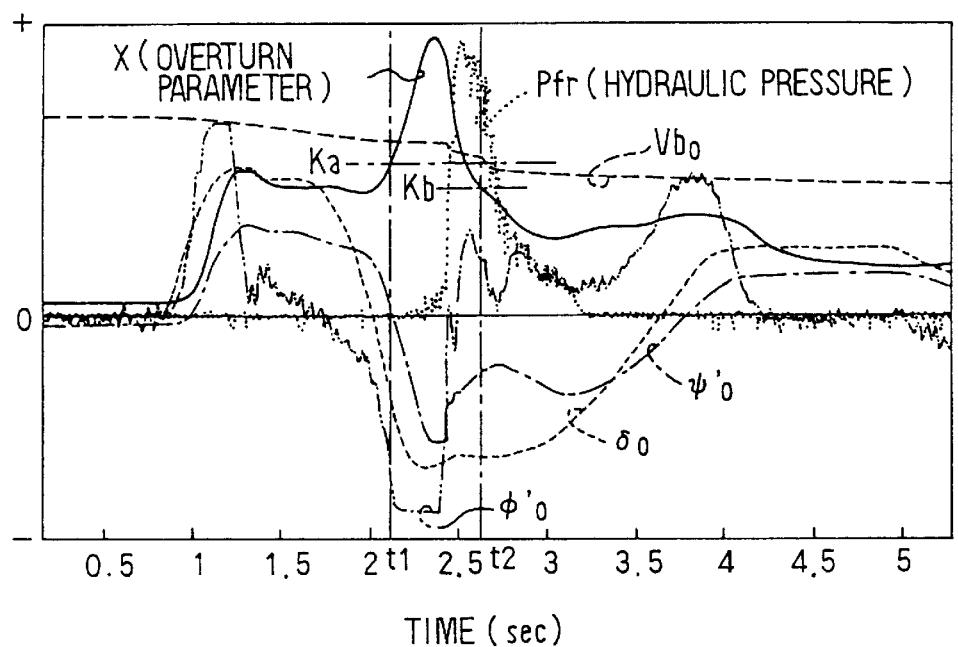
FIG. 8 is a graph showing the result detected by an exemplary experiment.

FIG. 8 shows changes of the respective detection values (calculated values) when the experimental vehicle has made the lane change running, i.e., the yaw rate φo', body speed Vbo, steering angle δo, roll rate φ0', overturn parameter X and braking force added to the front left wheel 22FL (which is brake hydraulic pressure added to the wheel cylinder 51FL and is a detection value indicated as Pfr (hydraulic pressure) in the figure), with respect to an elapse of time.

It was then found from FIG. 8 that it is possible to estimate the readiness of overturn of the experimental vehicle accurately at quick timing reliably before the wheel on the side of the steering direction floats by the overturn parameter X calculated based on the operational expression (3) and that the overturn (roll) of the experimental vehicle may be prevented reliably based on this overturn parameter X.

That is, it is apparent from FIG. 8 that the experimental vehicle has made the lane change running in the left direction because the steering angle δo has increased in the negative direction after increasing once in the positive direction.

Meanwhile, it is apparent that a rock-back phenomenon in which steering timing coincides with the timing has occurred in the experimental vehicle as the roll rate φ0' fluctuates largely from positive to negative during this lane change running.

It is also apparent that the overturn parameter X has become greater than the first evaluation coefficient Ka at the time when the steering angle δo increases in the negative direction and the roll rate φ0' increases in the negative direction similarly to the steering angle δo, i.e., at the point of time t1 in the stage before the right side wheel which is the wheel on the side of the steering direction of this experimental vehicle floats. It shows that the readiness of overturn of the experimental vehicle may be estimated at quick timing reliably before the wheel on the side of the steering direction floats by the overturn parameter X because the overturn parameter X is calculated as a value increasing/decreasing stepwise corresponding to the actual behavior (overturn behavior) of the experimental vehicle and is calculated as a value estimating the readiness of overturn (roll) of the running vehicle (experimental vehicle), i.e., the possibility of overturn (roll), to,be always large (risk side).

It then can be seen that the ECU 20 in the experimental vehicle has judged that the possibility of overturn (roll) of this experimental vehicle is high at the point of time t1 when the overturn parameter X has become greater than the first evaluation coefficient Ka (in other words, turn a control flag ON) and has increased the braking force added to the front wheel (the front left wheel 22FL) on the opposite side from the steering direction of this experimental vehicle.

That is, it can be seen that the braking force (Pfr (hydraulic pressure) added to the front left wheel 22FL was effectively increased after an elapse of 0.2 to 0.3 sec from the point of time t1 due to the delay of control of the control system of the vehicle behavior control system in the experimental vehicle and that the yaw rate φo' and the roll rate φ0' which have increased in the negative direction fluctuate largely in the direction of zero and that the overturn parameter X has decreased considerably.

Then, it can be seen that the ECU 20 has judged that the possibility of overturn (roll) of the vehicle is eliminated at point of time t2 when the overturn parameter X has become smaller than the second evaluation coefficient Kb, i.e., at the point of time t2 when the yaw rate φo' and the roll rate φ0' have fully fluctuated in the direction of zero (in other words, by turning off the control flag) and has reduced the braking force added to the front wheel (the front left wheel 22FL) on the opposite side from the steering direction of this experimental vehicle.

It shows that the experimental vehicle may be prevented from overturning (rolling) even when the experimental vehicle makes the lane change running and causes the rock-back phenomenon by making the control for preventing the overturn (roll) of the experimental vehicle based on the overturn parameter X calculated based on the operational expression (3).

Accordingly, it was confirmed from the experimental result shown in FIG. 8 that the overturn parameter X calculated based on the operational expression (3) allows the readiness of overturn of the experimental vehicle to be accurately estimated at quick timing reliably before the wheel on the side of the steering direction floats and allows the overturn (roll) of the experimental vehicle to be prevented reliably.

[Third embodiment]

Figure 10:
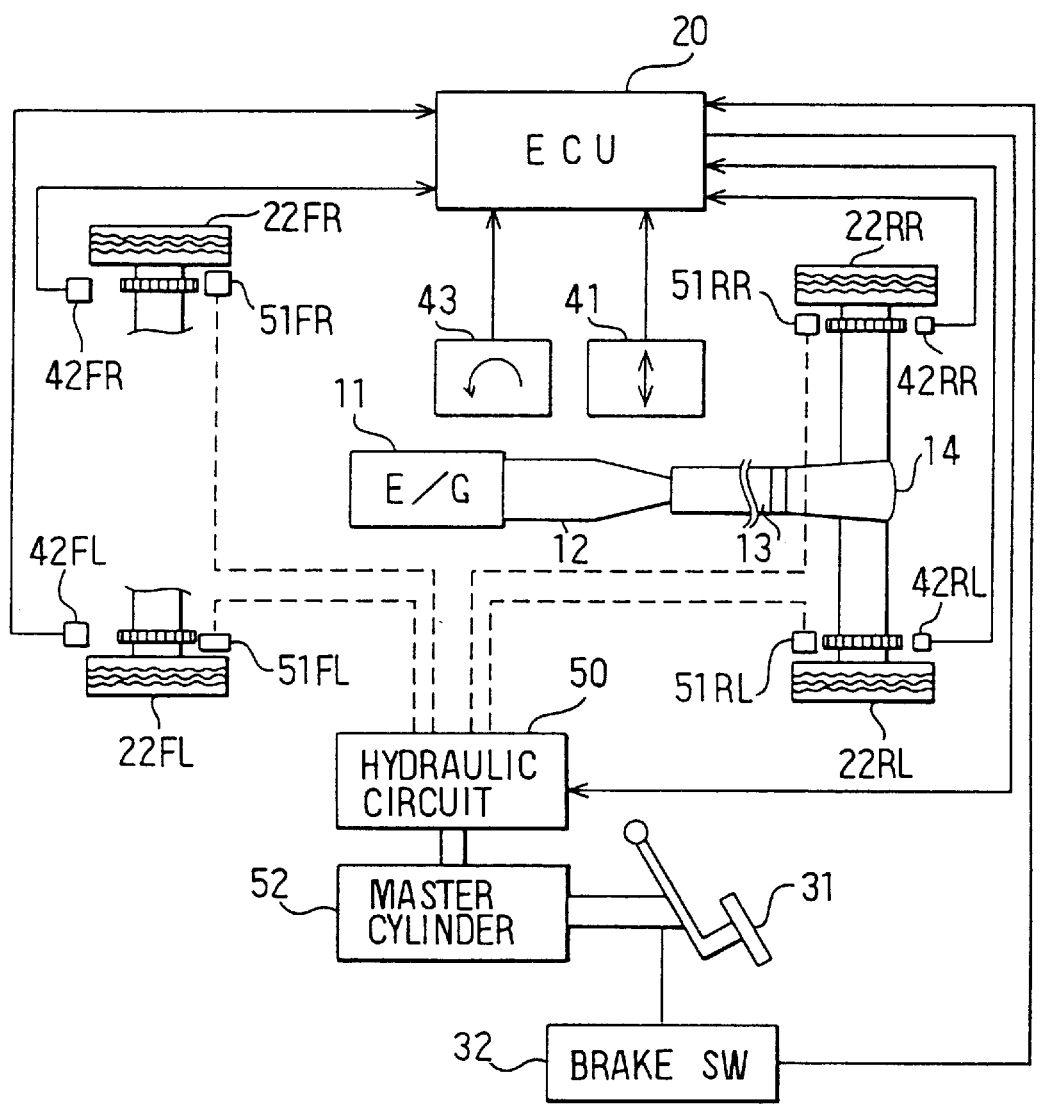
FIG. 10 is a schematic structural view showing the whole structure of a body slip angle control device to which a body slip angle estimating system is applied.

FIG. 10 is a schematic structural view showing the whole structure of a body slip angle control device to which a body slip angle estimating system of third embodiment of the invention is applied. It is noted that the body slip angle estimating system of the present embodiment is applied to a front-engine rear-drive (FR) type vehicle.

As shown in FIG. 10, driving force (driving torque) of the vehicle outputted from an internal combustion engine 21 via a transmission 11 is distributed to right and left rear wheels (driving wheels) (rear left wheel 22RL and rear right wheel 22RR) via a propeller shaft 13 and a differential gear 14.

Hydraulic braking units (hereinafter referred also to as a wheel cylinder) 51FL, 51FR, 51RL and 51RR for giving braking force to the respective wheels 22FL to 22RR are provided at the respective wheels (front left wheel 22FL, front right wheel 22FR, rear left wheel 22RL and rear right wheel 22RR).

Then, when a driver steps down a brake pedal 31, brake oil is force-fed from a master cylinder 52 braking hydraulic pressure applied to the respective wheel cylinders 51FL through 51RR is boosted via a hydraulic circuit 50 and braking force is applied to the respective wheels 22FL through 22RR.

The respective wheels 22FL through 22RR are also provided with wheel speed sensor 42FL, 42FR, 42RL and 42RR for detecting revolution speed of the respective wheels 22FL through 22RR (hereinafter referred to also as wheel speed).

Then, detection signals from the wheel speed sensors 42FL through 42RR are inputted to an electronic control unit (ECU) 20 similarly to detection signals from a yaw rate sensor 43 as yaw rate measuring means and a lateral acceleration sensor 41 as lateral acceleration measuring means, i.e., from other sensors provided in the vehicle.

The ECU 20 controls the braking force applied to the respective wheels 22FL through 22RR by controlling the braking hydraulic pressure applied to the respective wheel cylinders 51FL through 51RR by driving various actuators (not shown) provided within the hydraulic circuit 50 besides the control of the brake pedal 31 manipulated by the driver.

That is, the ECU 20 estimates a body slip angle which is an angle formed between the direction of longitudinal axis of the body and the actual vehicle advancing direction by using input signals from the respective sensors described above in driving (turning) the vehicle and executes a body slip angle controlling process and others for appropriately increasing the braking force (wheel cylinder pressure) applied to the front wheel on the side of the turning outer wheel among the right and left front wheels 22FL and 22FR so as to reduce the body slip angle in correspondence to the estimation value of the body slip angle (correspondingly to the estimation value of the body slip angle and the estimation value of a body slip angular velocity to the estimation value of the body slip angle to be concrete).

It is noted that the ECU 20 is constructed centering on a microcomputer comprising a CPU, a ROM, a RAM and others. A detection signal from a brake switch 32 which turns ON and lights up a stop lamp (not shown) when the brake pedal 31 is stepped is also inputted to the ECU 20.

Figure 11:
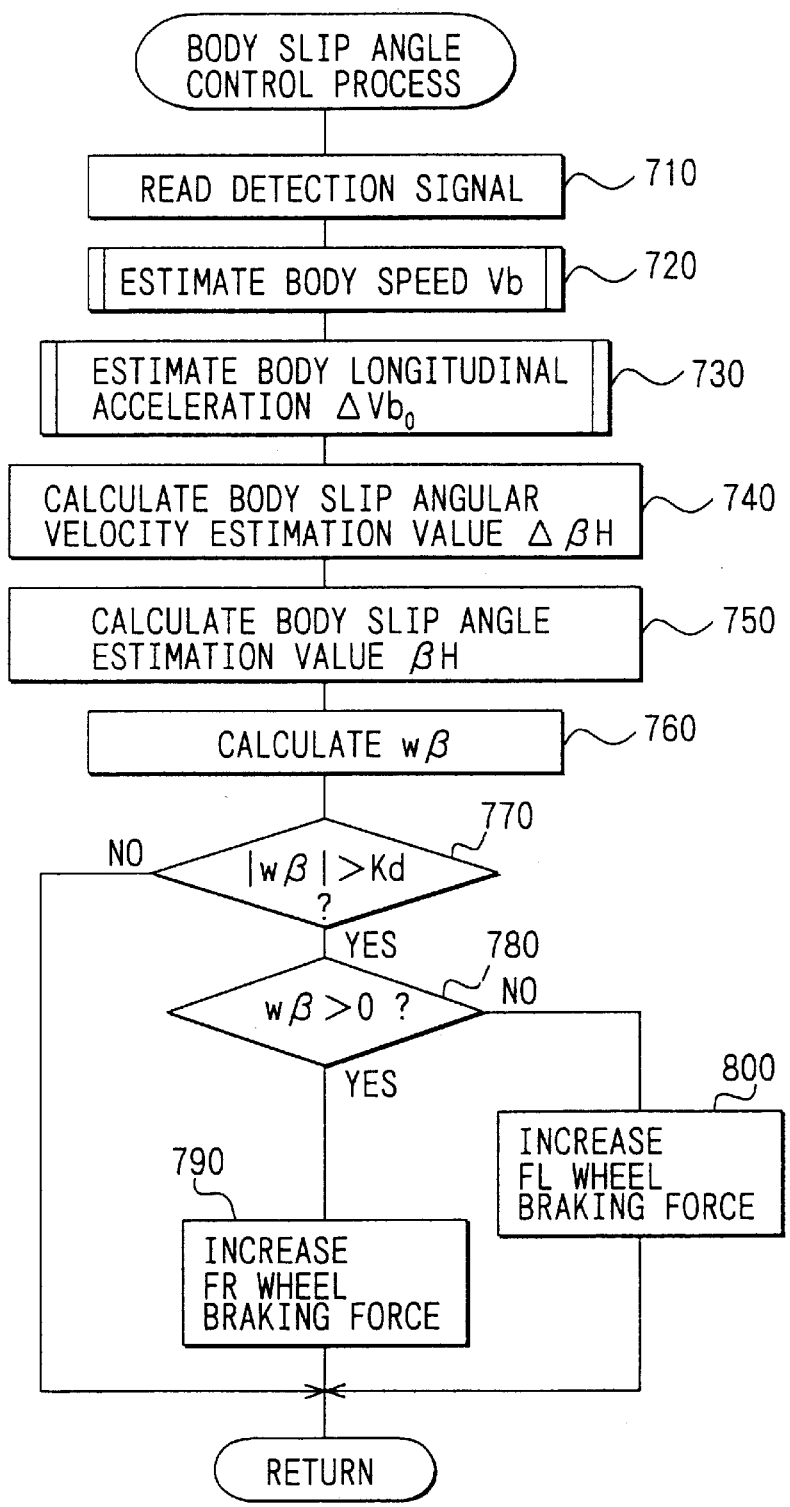
FIG. 11 is a flowchart showing a body slip angle control process executed in an electronic control unit (ECU)

Next, the body slip angle controlling process executed repeatedly in the ECU 20 in driving (turning) the vehicle will be explained along flowcharts shown in FIGS. 11 through 13. When the body slip angle controlling process is started, the ECU 20 reads detection signals from the above-mentioned respective sensors and the brake switch 32 in S710 (S denotes a step) as shown in FIG. 11. Then, it executes the body speed estimating process in S720.

Figure 12:
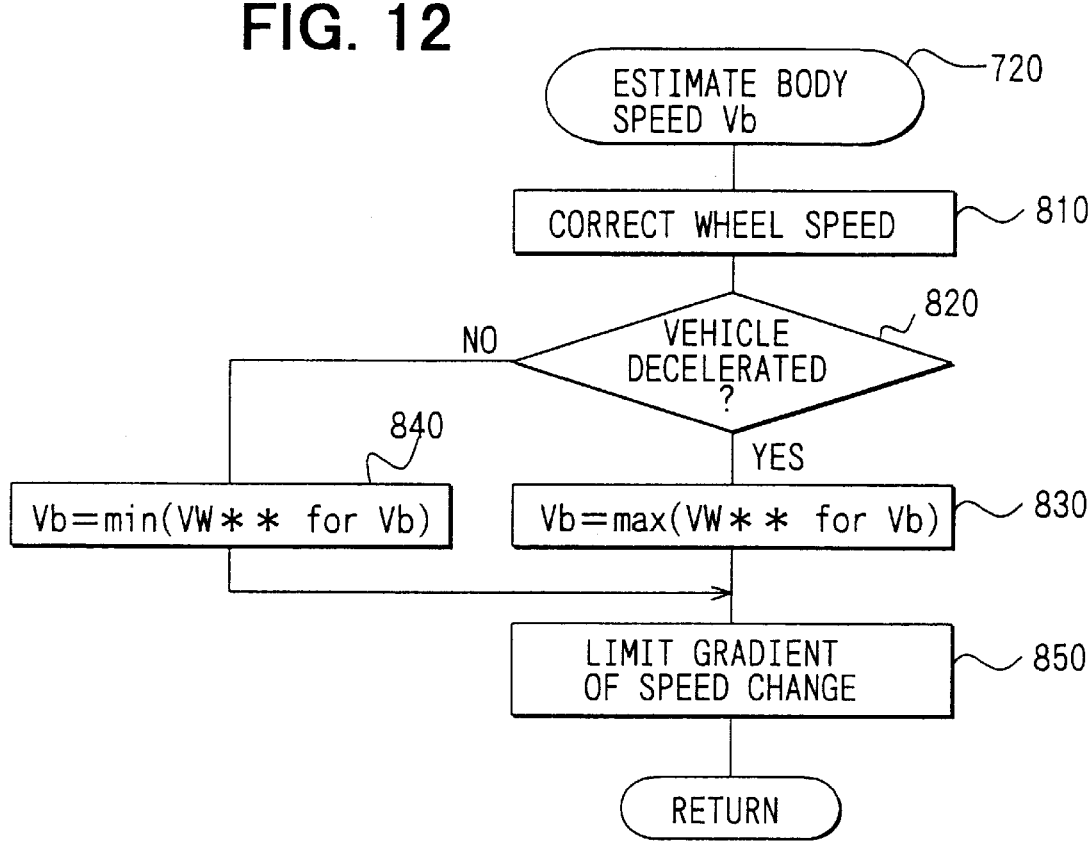
FIG. 12 is a flowchart showing a body speed estimating process executed in S720 in FIG. 11.

The body speed estimating process is a process for estimating (measuring) the body speed Vb of the vehicle based on the detection signals read in S710 and is executed as shown in FIG. 12.

That is, corrective computation of the wheel speed of the respective wheels 22FL through 22RR is carried out at first in S810 in the body speed estimating process. To be concrete, the corrective computation for converting the wheel speeds VWFL, VWFR, VWRL and VWRR of the respective wheels 22FL through 22RR detected from the input signals from the wheel speed sensors 42FL through 42RR to speed of position of gravity of the vehicle is carried out by using the following expressions (3A) through (6A) using yaw rate $\Delta\theta$ of the vehicle detected from the input signals from the yaw rate sensor 43:

$$VWFL\text{for}Vb = VWFL - Lf \times \Delta\theta \quad (3A)$$

$$VWFR\text{for}Vb = VWFR - Lf \times \Delta\theta \quad (4A)$$

$$VWRL\text{for}Vb = VWRL - Lr \times \Delta\theta \quad (5A)$$

$$VWRR\text{for}Vb = VWRR - Lr \times \Delta\theta \quad (6A)$$

It is noted that among the parameters in the expressions (1A) through (6A), VWFLfor Vb, VWFRfor Vb, VWRLfor Vb, and VWRRfor Vb denote wheel speed of the respective wheels 22FL through 22RR after the correction. Lf denotes a shortest distance from the center of gravity of the vehicle to the front shaft (front drive shaft) and Lr denotes a shortest distance from the center of gravity of the vehicle to a rear shaft (rear drive shaft). The yaw rate $\Delta\theta$ which is a detection value from the yaw rate sensor 43 is outputted as a positive value during left turn and as a negative value during right turn.

Next, it is judged whether or not the vehicle is decelerating in S820. This judgment is made by judging whether or not the input signal from the brake switch 32 is ON.

When it is judged that the vehicle is decelerating in S820, the process is shifted to S830 to calculate the body speed Vb (estimated value) by the following expression (7A):

$$Vb = \max(VW^{**}\text{for }Vb) \quad (7A)$$

It is noted that VWfor Vb denotes a wheel speed of the all wheels calculated by the above expressions (3A) through (6A) after the correction  denotes the respective wheels 22FL through 22RR. The above expression (7A) shows that the maximum wheel speed among the wheel speeds of the all wheels after the correction is calculated as the body speed Vb.

That is, when the vehicle is decelerating, there is a possibility that the wheel enters deceleration slip and the wheel speed of the wheel which enters the deceleration slip (the wheel speed after the correction) becomes extremely small as compared to the body speed.

Then, the maximum wheel speed corresponding to the wheel speed of the wheels which have not enter the deceleration slip (or the wheels which are gripped to the road surface) after the correction is calculated as the body speed Vb in S830.

Meanwhile, when it is judged that the vehicle is not decelerating in S820, the process is shifted to S840 to calculate the body speed Vb (estimated value) by the following expression (8A):

$$Vb = \min(VW^{**}\text{for }Vb) \quad (8A)$$

The above expression (8A) shows that the minimum wheel speed among the wheel speeds of all wheels after the correction is calculated as the body speed Vb.

That is, a case of accelerating the vehicle for example may be considered as a case when the vehicle is not decelerating and there is a possibility that the wheel speed (wheel speed after the correction) of the wheel which has entered acceleration slip becomes extremely large as compared to the body speed.

Then, the minimum wheel speed corresponding to the wheel speed of the wheel not entered the acceleration slip (the wheel gripped on the road surface) after the correction among the wheel speeds of all wheels after the correction is calculated as the body speed Vb in S840.

When the body speed Vb is calculated in S830 or S840, the process is shifted to S850.

The ECU 20 limits gradient of change of the body speed Vb calculated as described above and ends the body speed estimating process.

That is, the ECU 20 corrects the body speed Vb calculated by the flow of this time by limiting the variation from the body speed calculated in the previous flow to the body speed calculated by the flow of this time in correspondence to the body longitudinal acceleration $\Delta Vb$ which is acceleration in the longitudinal axis of the body calculated as the estimation value in the process of S730 (described later) during the previous flow in S850.

When the body speed Vb is thus estimated (measured) by the body speed estimating process (S720), the ECU 20 executes a body longitudinal acceleration estimating process in S730 (see FIG. 11).

Figure 13:
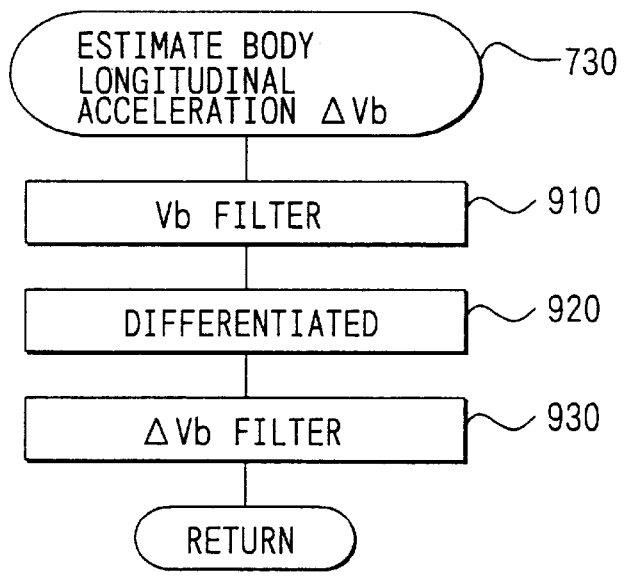
FIG. 13 is a flowchart showing a body longitudinal acceleration estimating process executed in S730 in FIG. 11.

This body longitudinal acceleration estimating process is a process for calculating the body longitudinal acceleration $\Delta Vb$ (estimated value) in the flow of this time and is executed as shown in FIG. 13.

That is, the ECU 20 filters the body speed Vb calculated by the body speed estimating process (S720) within a predetermined time till the flow of this time by a low-pass filter in S910 at first in the body longitudinal acceleration estimating process. To be concrete, noise within the body speed Vb as the estimation value is removed by using the low-pass filter which transmits only frequency of 10 Hz or less for example.

Next, the body speed Vb filtered in S910 is differentiated in S920.

Then, the value calculated in S920, i.e., the body longitudinal acceleration $\Delta Vb$, is filtered in S930 and completes the body longitudinal acceleration estimating process. To be concrete, the ECU 20 applies a low-pass filter which transmits only frequency of 2 Hz or less to the body longitudinal acceleration ΔVb calculated in S920.

When the ECU 20 calculates the body longitudinal acceleration ΔVb (estimated value) in the flow of this time by the body longitudinal acceleration estimating process (S730), it then calculates a body slip angular velocity estimation value ΔβH by using the following expression (9A) which contains parameters of the yaw rate Δθ detected from the input signals of the yaw rate sensor 43 in S740 (see FIG. 11), the lateral acceleration Gy of the vehicle detected from the input signals of the lateral acceleration sensor 41, the body speed Vb estimated (measured) by the body speed estimating process (S720) and H3 which is represented by H1 and H2 defined in expressions (13A) and (14A) described later as H3=H1/H2:

$$\Delta\beta H = H3(\Delta\theta) - Gy/Vb \tag{9A}$$

It is noted that the lateral acceleration Gy which is the detection value from the lateral acceleration sensor 41 is outputted as a positive value during left turn (revolution) and as negative value during right turn (revolution). When the vehicle is running at extremely low speed (when it is running at the extremely low speed under the limit of resolution of the wheel speed sensors 42FL through 42RR such as 5 km/h or less), a fixed value, e.g., 5 km/h, is substituted to Vb to calculate the body slip angular velocity estimation value ΔβH so as not to calculate by setting Vb as 0 in the expression (9A).

Then, in S750, the ECU 20 calculates a body slip angle estimation value βH by integrating the body slip angular velocity estimation value ΔβH calculated in S740. The body slip angular velocity estimation value ΔβH is integrated by the following expression (10A) to prevent an overflow which is otherwise caused by accumulation of errors:

$$\beta H_{(n)} = (\beta H_{(n-1)} + \Delta\beta H) \cdot k1 \tag{10A}$$

It is noted that k1 in the expression (10A) is a constant and is set as k1=0.99 for example. n denotes a number of times of calculation. $\beta H_{(n)}$ is the body slip angle estimation value βH calculated in the flow of this time and $\beta H_{(n-1)}$ is the body slip angle estimation value βH calculated in the previous flow. The body slip angle estimation value βH thus calculated is outputted as a positive value when the direction of the longitudinal axis of the body is inclined in the left direction with respect to the actual vehicle advancing direction and as a negative value when it is inclined in the right direction.

Here, the expression (9A) used in finding the body slip angular velocity estimation value ΔβH by the process of S740 is set as described later.

That is, a physical model (Laplace transform model) describing the relationship between the actual yaw rate Δϕ (see the explanation on Δϕ described before and the roll angle φ of the vehicle and a physical mode (Laplace transform model) describing the relationship between the lateral acceleration Gy and the roll angle φ are represented by the following expressions (11A) and (12A):

$$\phi = \{Ka/(Js^2 + Ds + K)\} \cdot Vb \cdot \Delta\phi \tag{11A}$$

(where, Ka: constant, J: roll inertia, D: damper constant, K: spring constant)

$$\phi = \{Kb/(s + Kc)\} \cdot Gy \tag{12A}$$

(where, Kb, Kc: constant)

Then, a relational expression between the yaw rate Δθ and the roll angle φ, i.e., the detection values, may be obtained by substituting Δϕ=Δθ−Δβ to the expression (11A) based on the expression (2A) representing the relationship among the value Δθ detected by the yaw rate sensor, the actual yaw rate Δϕ and the body slip angular velocity Δβ. Further, the expressions (11A) and (12A) may be transformed into the expressions (15A) and (16A) by setting as follows with respect to the expressions (11A) and (12A) to define secondary delay element H1 of the yaw rate Δθ (actual yaw rate Δϕ) to the roll angle φ and primary delay element H2 of the lateral acceleration Gy to the roll angle φ:

$$H1 = Ka/(Js^2 + Ds + K) \tag{13A}$$

$$H2 = Kb/(s + Kc) \tag{14A}$$

$$\phi = H1(Vb \cdot (\Delta\theta - \Delta\beta)) \tag{15A}$$

$$\phi = H2(Gy) \tag{16A}$$

Then, the following expression (17A) may be obtained by equaling the right side of the expression (15A) with the right side of the expression (16A) as H3=H1/H2:

$$H3(\Delta\beta) = H3(\Delta\theta) - Gy/Vb \tag{17A}$$

The expression (9A) may be obtained by setting H3 (Δβ) in the expression (17A) as the body slip angular velocity estimation value ΔβH.

It is noted that although the body slip angular velocity estimation value ΔβH calculated in the expression (9A) is what is represented as H3 (Δβ), not as the body slip angular velocity Δβ, from the representation in the expression (17A), this estimation value ΔβH is practically applicable as a value accurately estimating the actual body slip angular velocity Δβ as shown in the experimental examples described later.

That is, the expression (9A) is an expression in which the yaw rate Δθ is corrected by H3 in the expression (1A) used in estimating the body slip angle Δβ in the prior art. Because this correction value H3 (Δθ) is set as a value to which the measuring error of the lateral acceleration Gy detected by the lateral acceleration sensor 41 is added, it is possible to calculate the body slip angular velocity estimation value ΔβH as a value close to the true value Δβ by the expression (9A) even when the vehicle spins or when the roll angle φ of the vehicle becomes large.

Then, the body slip angle estimation value βH may be calculated as an estimation value which almost coincides with the actual body slip angle β even when the vehicle spins or when the roll angle φ of the vehicle becomes large by the process of S750 using this body slip angular velocity estimation value ΔβH as a result. That is, this estimation value βH may be applied as a value accurately estimating the actual body slip angle β.

When the ECU 20 calculates the body slip angular velocity estimation value ΔβH in the process of S740 and the body slip angle estimation value βH in the process of S750 as described above, it shifts the process to S760 this time.

The ECU 20 calculates PI controlling parameter wβ of the body slip angle β by the following expression (18A) using the body slip angular velocity estimation value ΔβH (calculated value in the present flow) and the body slip angle estimation value βH (calculated value in the present flow):

$$w\beta = k2 \cdot b H + k3 \cdot \Delta\beta H \tag{18A}$$

(where, k2, k3: constant)

Next, it is judged whether or not the absolute value of the PI controlling parameter wβ is greater than an evaluation coefficient Kd in S770.

When it is judged that the absolute value of the PI controlling parameter wβ is greater than the evaluation coefficient Kd in S770, i.e., when it is judged that the vehicle running (turning) state is unstable (the vehicle is spinning for example), the process is shifted to S780 to judge whether or not the PI controlling parameter wβ is greater than zero in this time.

When it is judged that the PI controlling parameter wβ is greater than zero in S780, i.e., when it is judged to be positive, the process is shifted to S790 to judge that the front wheel on the side of the outer turning wheel is the front right wheel 22FR. Then, the ECU 20 drives the various actuators within the hydraulic circuit 50 to appropriately increase the braking force applied to the front right wheel 22FR, i.e., the braking hydraulic pressure applied to the wheel cylinder 51FR, to reduce the body slip angle β. Thus, the ECU 20 ends the body slip angle controlling process.

When it is judged in S780 that the PI controlling parameter wβ is smaller than zero, i.e., as minus, the process is shifted to S800 to judge that the front wheel on the side of the turning outer wheel is the front left wheel 22FL. Then, the ECU 20 drives the various actuators within the hydraulic circuit 50 to appropriately increase the braking force applied to the front left wheel 22FL, i.e., the braking hydraulic pressure applied to the wheel cylinder 51FL, to reduce the body slip angle β. Thus, the ECU 20 ends the body slip angle controlling process.

When it is judged that the absolute value of the PI controlling parameter wβ is not greater than the evaluation coefficient Kd in S770, the vehicle running (turning) state is stable. Then, it is judged that it is not necessary to increase the braking force of either one of the front left and right wheels 22FL and 22FR and the body slip angle controlling process is ended.

It is noted that the process of S720 corresponds to body speed measuring means, the process of S140 corresponds to body slip angular velocity estimation value calculating means and the process of S150 corresponds to body slip angle estimation value calculating means.

As described above, the body slip angle estimation value βH is calculated in the present embodiment by calculating the body slip angular velocity estimation value ΔβH (S740) by using the expression (9A) based on the yaw rate Δθ, the lateral acceleration Gy and the body speed Vb measured in S710 and S720 and by integrating the body slip angular velocity estimation value ΔβH by using the expression (10A).

Then, according to the present embodiment, the body slip angle estimation value βH thus calculated almost coincides with the actual body slip angle β even when the vehicle spins or when the roll angle φ of the vehicle becomes large and may be applied as a value accurately estimating the actual body slip angle β.

That is, the present embodiment allows the body slip angular velocity estimation value ΔβH to be calculated as a value close to the true value Δβ even when the vehicle spins or when the roll angle φ of the vehicle becomes large because H3(Δθ) which is a correction value of the yaw rate Δθ is set as a value to which the measuring error of the lateral acceleration Gy is added in the expression (9A) (S740). As a result, it is possible to calculate the body slip angle estimation value βH (S750) as a value accurately estimating the body slip angle β.

Further, according to the present embodiment, the ECU 20 evaluates the body slip angle estimation value βH (the body slip angle estimation value βH and the body slip angular velocity estimation value ΔβH to be concrete) thus calculated (S770 and S780) and when it judges that the vehicle running (turning) state is unstable (the vehicle is spinning for example), it appropriately increase either one braking force of the left and right front wheels 22FL and 22FR (S790 and S800) to reduce the body slip angle β. Accordingly, it is possible to enhance the control stability of the vehicle in running the vehicle or in turning the vehicle in particular.

While the third embodiment of the present invention has been described above, the invention is not limited to the embodiment described above and may take various modes.

For example, although the case in which the invention is applied to the front-engine and rear-drive (FR) type vehicle, i.e., a rear wheel driving car, has been explained in the embodiment described above, the same effect with the above embodiment may be obtained even when the invention is applied to a front-engine and front-drive (FF) type vehicle, i.e., a front wheel driving car.

Further, although the lateral acceleration Gy has been directly measured by the lateral acceleration sensor 41 in measuring the lateral acceleration Gy (S710) used in calculating the body slip angular velocity estimation value ΔβH and the body slip angle estimation value βH (S740 and S750) in the embodiment described above, it is also possible to calculate a estimation value GyH to the lateral acceleration Gy by providing a roll rate sensor 44 instead of the lateral acceleration sensor 41 to measure roll rate Δφ of the vehicle by the roll rate sensor 44 and by applying the roll rate Δφ detected from input signals from the roll rate sensor 44 to a physical model describing the relationship between the roll rate and the lateral acceleration represented by the following expression (19A) by the ECU 20:

$$GyH = \{Ke/(s+Kf)\} \cdot \Delta\phi \tag{19A}$$

(where, Ke, Kf: constant)

It allows the lateral acceleration Gy (the estimation value GyH of the lateral acceleration Gy, to be concrete) used in calculating the body slip angular velocity estimation value ΔβH and the body slip angle estimation value βH to be measured without using the lateral acceleration sensor 41.

It is noted that the roll rate sensor of this time corresponds to roll rate measuring means and the process for calculating the lateral acceleration Gy (estimated value GyH) carried out by the ECU 20 by using the expression (19A) corresponds to lateral acceleration calculating means.

Further, although the expressions (3A) through (6A) using the vehicle yaw rate Δθ have been used in converting the wheel speeds VWFL through VWRR into the speed of position of center of gravity of the vehicle (S810) in the embodiment described above, the yaw rate Δθ in the expressions (3A) through (6A) may be calculated as a converted value ΔθH by the following expression (20A) using the lateral acceleration Gy detected from the input signal of the lateral acceleration sensor 41:

$$\Delta\theta H = Gy/Vb_{(n-1)} \tag{20A}$$

It is noted that $Vb_{(n-1)}$ in the expression (20A) is a body speed Vb calculated in the previous flow. When the vehicle is running at extremely low speed, e.g., when it is running at extremely low speed which is less than the limit of resolution of the wheel speed sensors 42FL thorough 42RR such as 5 km/h or less), $\Delta\theta H$ may be calculated by substituting a fixed value, e.g., 5 km/h, to $Vb_{(n-1)}$ so as not to calculate by setting $Vb_{(n-1)}$ as zero in the expression (20A).

Further, although it has been judged whether or not the vehicle is decelerating by using the input signal from the brake switch 32 in the body speed estimating process (S720) in the embodiment described above, one of the following three modes ((1) through (3)) may be adopted for example. It is also possible to adopt a mode in which at least two of the following three modes ((1) through (3)) and the mode of the embodiment described above, i.e., the mode of using the input signal from the brake switch 32 are combined together.

(1) It is judged whether or not the vehicle is accelerating by judging whether the body longitudinal acceleration $\Delta Vb$ (value calculated in the previous flow) calculated in the body longitudinal acceleration estimating process (S730) is positive or negative.

(2) It is judged whether or not the vehicle is decelerating by detecting an IDL (idling) signal, e.g., a signal whose output changes depending whether or not the accelerator pedal (not shown) is stepped on, by the ECU 20.

(3) It is judged whether or not the vehicle decelerating by providing a master cylinder pressure sensor (not shown) for detecting pressure within the master cylinder 52 and by judging whether or not the value (pressure) detected by the master cylinder pressure sensor is greater than a reference value and the wheel braking force is substantially generated.

Further, the process for measuring (estimating) the body speed Vb (which corresponds to the body speed measuring means) may be what detects an average value (average driven wheel speed) of revolution speed of right and left driven wheels obtained by wheel speed sensors for detecting wheel speed of the right and left driven wheels (front wheels 22FL and 22FR in case of the front-engine and rear-drive type vehicle) as the body speed Vb (estimated value).

Next, various exemplary experiments which support the effect of the embodiment described above will be explained.

[First Experiment]

It has been verified whether the body slip angular velocity estimation value $\Delta\beta H$ calculated by the expression (9A) is applicable as a value accurately estimating the actual body slip angular velocity $\Delta\beta$ by driving an experimental vehicle provided with a body slip angle estimating unit similarly to the embodiment described above and a steering angle sensor (not shown) in a case when a lane change involving a spin is made (speed: 55 km/h) and a case when normal turn (that is, a turn without causing spin of the vehicle) is made (speed: 40 km/h).

The result of this experiment will be explained by using FIGS. 14 and 15.

Figure 14:
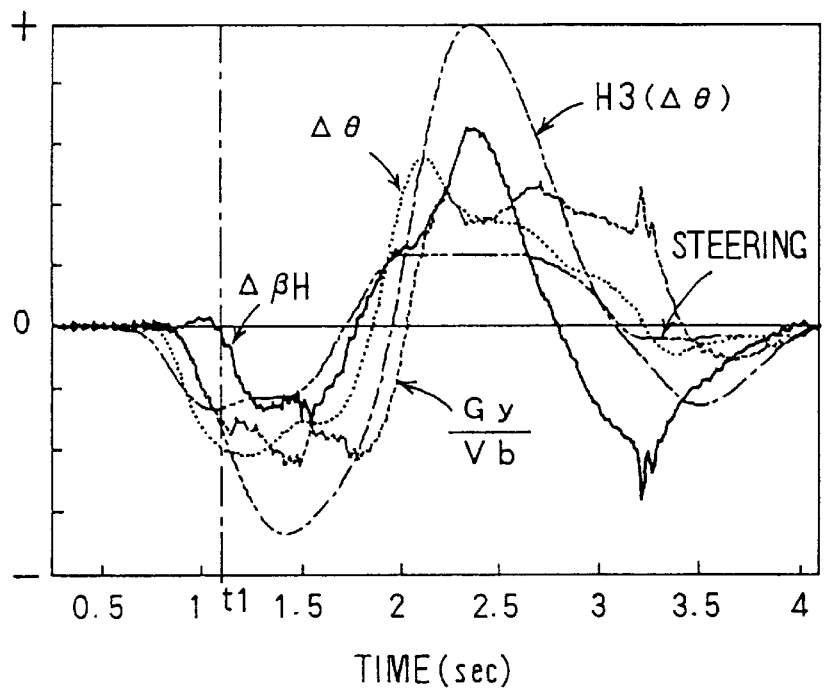
FIG. 14 is a graph showing a detected result of a first experiment.

FIG. 14 shows changes of the respective detection values (calculated values), i.e., $\Delta\theta$, $H3(\Delta\theta)$, $Gy/Vb$, $\Delta\beta H$ and the detection value of the steering angle sensor (detection value indicated as "Steering" in the graph) with respect to elapse of time in case when the lane change involving the spin is made by the experimental vehicle. It is noted that the detection value from the steering angle sensor is outputted as a positive value when steering to the left and as a negative value when steering to the right.

Then, it has been found from FIG. 14 that the body slip angular velocity estimation value $\Delta\beta H$ calculated by the expression (9A) is detected (calculated) as a value close to the actual body slip angular velocity $\Delta\beta$, differing from the conventional estimation value $\Delta\beta p$ calculated by the expression (1A) (quantitative comparison of b and $\beta H$ is described later in a second exemplary experiment).

That is, it has been found that the yaw rate $\Delta\theta$ (detection value of the yaw rate sensor 43 not corrected by H3) starts to separate from $Gy/Vb$ right after the moment when the steering is steered (in other words, the moment before time t1 and the detection value of the steering angle sensor becomes minus) before the time t1 when this experimental vehicle is considered to have spun (in other words, the moment before the time t1 and the actual body slip angular velocity $\Delta\beta$ assumes a value close to zero). As a result, it was found that the estimation value $\Delta\beta p$ (not shown) of the body slip angular velocity $\Delta\beta$ calculated by the expression (1A) becomes a value different from zero at the time before the time t1 and that it is unable to accurately detect when the experimental vehicle has started to spin even after the time t1. Accordingly, it was found that it is unable to calculate a value close to the true value $\Delta\beta$ by the first expression.

Meanwhile, it was found that the correction value H3 ($\Delta\theta$) of the yaw rate $\Delta\theta$ and $Gy/Vb$ are almost equal values before the time t1 and as a result, that the body slip angular velocity estimation value $\Delta\beta H$ which is calculated by the expression (9A) is close to zero and its estimation value $\Delta\beta H$ is close to the true value $\Delta\beta$.

It was then found that when this experimental vehicle spins (at time t1), H3 ($\Delta\theta$) starts to separate from $Gy/Vb$ and the corresponding body slip angular velocity estimation value $\Delta\beta H$ starts to change to a value different from zero. That is, it was found that the body slip angular velocity estimation value $\Delta\beta H$ shows the similar change with the true value $\Delta\beta$.

That is, the roll angle $\phi$ is considered to become large right after the point of time when the steering is steered before the time t1 and the spin also occurs on and after the time t1 in this experimental vehicle. Therefore, the lateral acceleration Gy detected by the lateral acceleration sensor 41 assumes a value different from lateral acceleration actually acting on the experimental vehicle and it is unable to detect (calculate) a value close to the actual body slip angular velocity $\Delta\beta$ by the expression (1A). However, it was found that it is possible to detect (calculate) a value close to the actual body slip angular velocity $\Delta\beta$ as the estimation value $\Delta\beta H$ by the expression (9A) in such cases.

Figure 15:
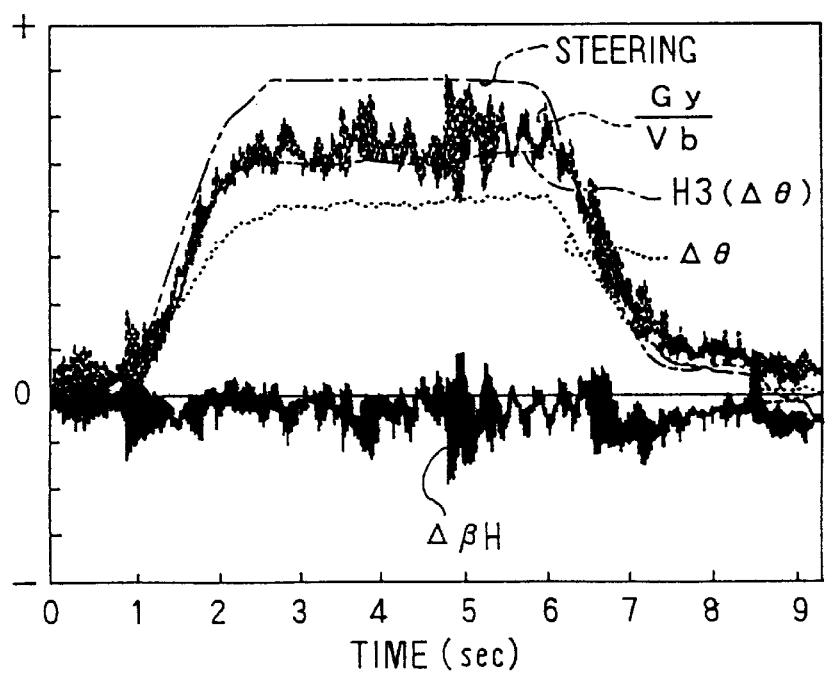
FIG. 15 is another graph showing a detected result of the first experiment.

FIG. 15 shows changes of the respective detection values (calculated values) described above with respect to elapse of time when the experimental vehicle makes a normal turn (a turn not involving a spin) (speed: 40 km/h).

It was found also in FIG. 15 that the body slip angular velocity estimation value $\Delta\beta H$ calculated by the expression (9A) is detected (calculated) as a value close to the actual body slip angular velocity $\Delta\beta$, differing from the prior art estimation value $\Delta\beta p$ calculated by the expression (1A).

That is, while the actual body slip angular velocity $\Delta\beta$ is considered to be always a value close to zero in this case, the yaw rate $\Delta\theta$ assumes a value different from $Gy/Vb$ during a turn and as a result, it was found that the prior art estimation value $\Delta\beta p$ calculated by the expression (1A) does not become a value close to zero during the turn and that it is unable to calculate a value close to the true value $\Delta\beta$ by the expression (1A).

Meanwhile, H3 ($\Delta\theta$) and $Gy/Vb$ become values always almost equal each other and as a result, it was found that the body slip angular velocity estimation value $\Delta\beta H$ always becomes a value close to zero and this estimation value $\Delta\beta H$ becomes a value close to the true value $\Delta\beta$.

That is, it was considered that the roll angle $\phi$ becomes large during the normal turn and the lateral acceleration Gy detected by the lateral acceleration sensor 41 becomes a value different from the lateral acceleration actually acting on the experimental vehicle. Then, it was found that although it is unable to detect (calculate) a value close to the actual body slip angle Δβ by the expression (1A), it is possible to detect (calculate) a value close to the actual body slip angular velocity Δβ as an estimation value ΔβH even in such a case.

Accordingly, it was confirmed from the experimental results shown in FIGS. 14 and 15 that the expression (9A) allows the body slip angular velocity estimation value ΔβH to be calculated as the value close to the true value Δβ even when the vehicle spins or when the roll angle φ of the vehicle becomes large because the correction value H3 (Δθ) of the yaw rate Δβ is set as the value in which the measuring error of the lateral acceleration Gy detected by the lateral acceleration sensor 41 is added.

That is, it was confirmed from the experimental result of the first experiment that the body slip angular velocity estimation value ΔβH calculated by the expression (9A) is applicable as a value accurately estimating the actual body slip angular velocity Δβ even when the vehicle spins or when the roll angle φ of the vehicle becomes large.

[Second Experiment]

It was verified by this experiment whether the body slip angle estimation value βH obtained by running an experimental vehicle fitted with the body slip angle estimating unit similar to the embodiment described above and a known ground speed meter (not shown) mounted at the rear part of the vehicle and by integrating the body slip angular velocity estimation value ΔβH calculated by the expression (9A) is applicable as a value accurately estimating the actual body slip angle β.

That is, the above-mentioned verification was carried out by the experimental vehicle by detecting the prior art body slip angle estimation value βp obtained by integrating the prior art body slip angular velocity estimation value Δβp calculated by the expression (1A) and the actual body slip angle β calculated from a value detected by the ground speed meter, besides the body slip angle estimation value βH in the above embodiment and by comparing those three values.

It is noted that advancing speed Vx in the direction of body longitudinal axis of the experimental vehicle and advancing speed Vy in the direction of body lateral axis (the direction which is vertical to the direction of body longitudinal axis and is parallel to an axle (front drive shaft and rear drive shaft) for example) were detected by the ground speed meter. Then, the actual body slip angle β (detection value) was calculated by the following expression (21A) in this experiment:

$$\beta = \tan^{-1}(Vy/Vx) \quad (21A)$$

The result of this experiment will be explained by using FIGS. 16 through 18.

Figure 16:
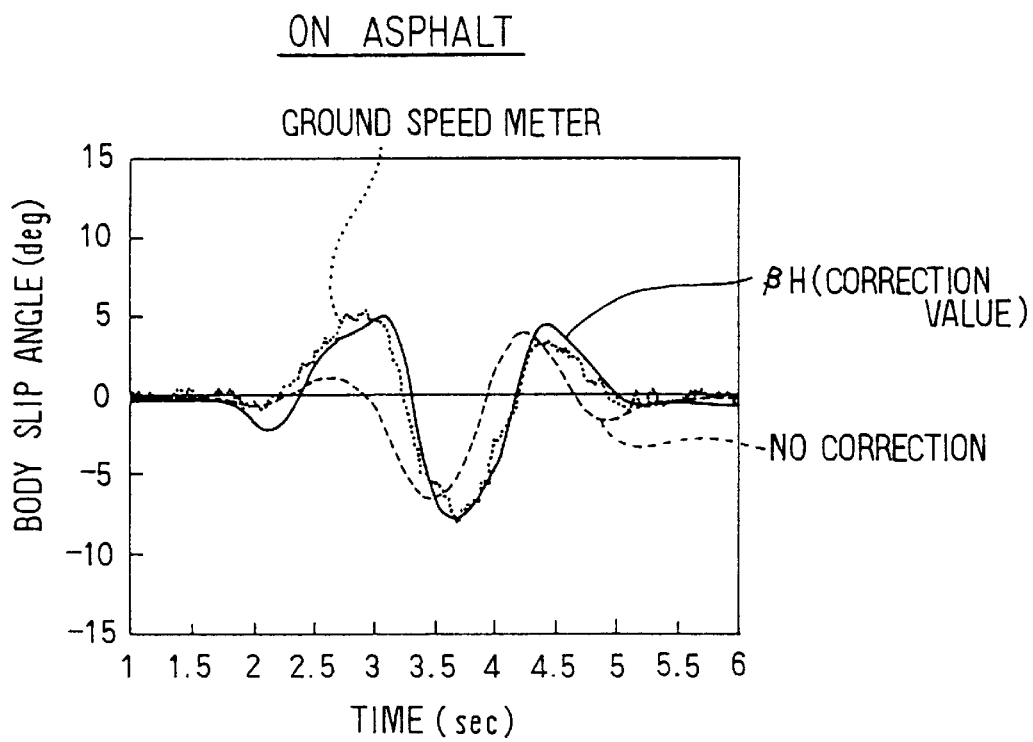
FIG. 16 is a graph showing a detected result of a second experiment.
Figure 17:
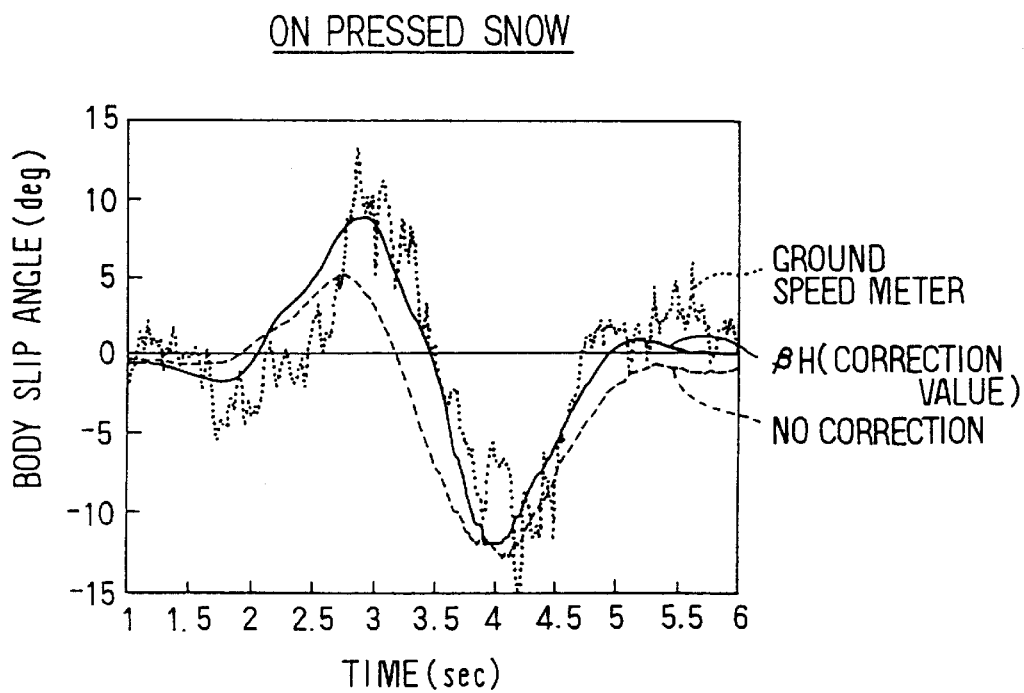
FIG. 17 is another graph showing a detected result of the second experiment.
Figure 18:
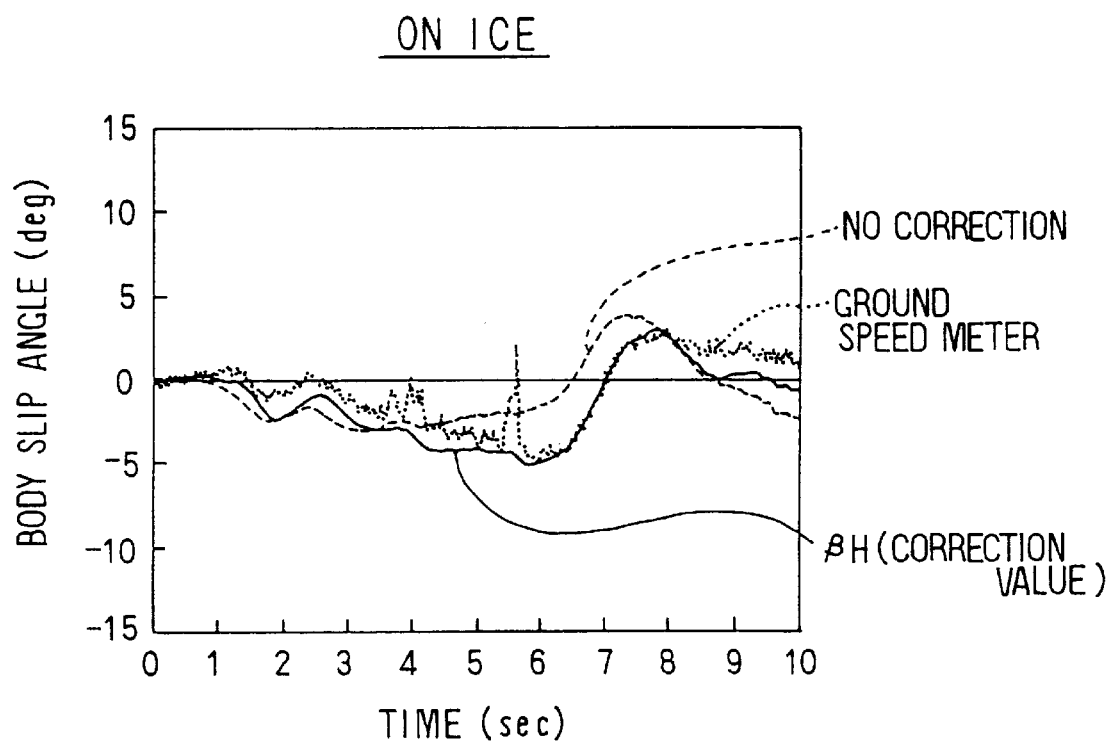
FIG. 18 is a further graph showing a detected result of the second experiment.
Figure 19A:
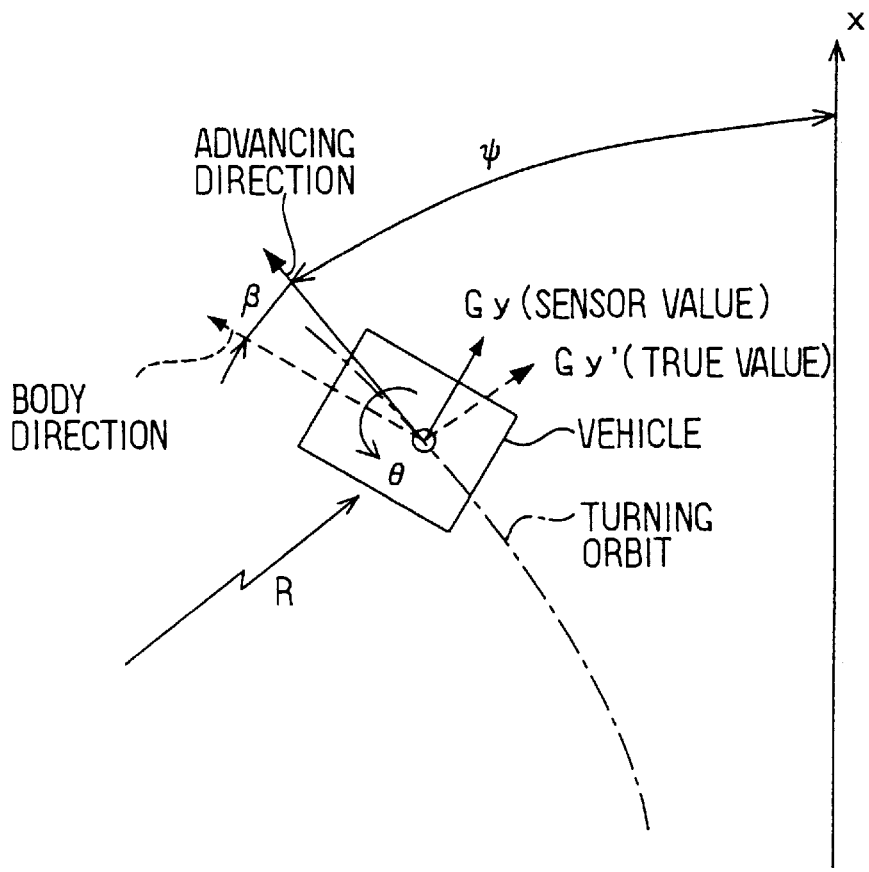
FIGS. 19A and 19B are explanatory diagrams for explaining that it is unable to estimate a body slip angle accurately by the conventional body slip angle estimating method.
Figure 19B:
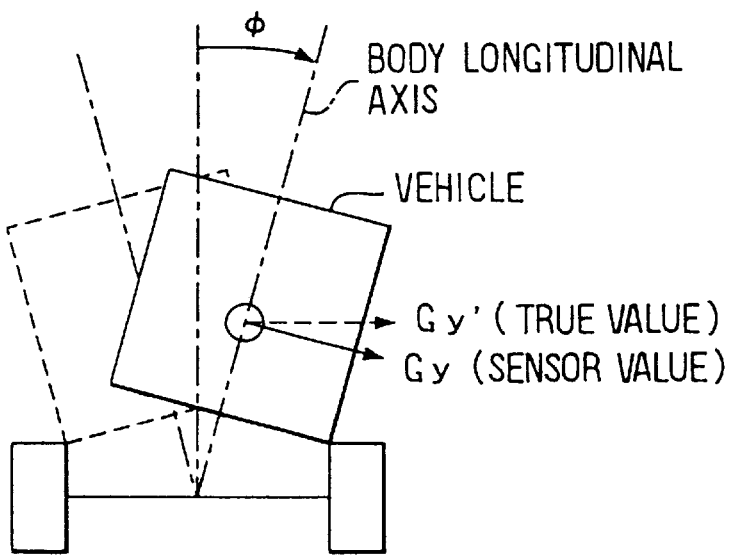

FIGS. 16 through 18 show changes of the body slip angle estimation value βH in the embodiment described above (detection value shown as "βH (correction value)" in FIGS. 16 through 18), the conventional body slip angle estimation value βp (detection value shown as "no correction" in FIGS. 16 through 18 and the actual body slip angle (detection value shown as "ground speed meter" in FIGS. 16 through 18) with respect to elapse of time, wherein FIG. 16 shows a case when the experimental vehicle is run on asphalt, FIG. 17 shows a case when the experimental vehicle is run on pressed snow and FIG. 19 shows a case when the experimental vehicle is run on ice.

It was then found that the body slip angle estimation value βH in the embodiment described above becomes a value close to the actual body slip angle β (detection value) as compared to the prior art body slip angle estimation value βp in running the vehicle so that the body slip angle β becomes fully large as compared to zero (that is, in running the vehicle so that it spins or the roll angle φ of the vehicle becomes large)

Accordingly, it was confirmed from the experimental result of the second experiment that the body slip angle estimation value βH in the embodiment described above is applicable as a value accurately estimating the actual body slip angle β even when the vehicle spins or when the roll angle φ of the vehicle becomes large.

What is claimed is:

1. A vehicle behavior estimating method for estimating an overturn parameter which represents readiness of overturn of a vehicle in running said vehicle, comprising steps of:

measuring a roll angle and a roll rate of said vehicle; and
    calculating an estimation value of said overturn parameter by using the measured result of said roll angle and roll rate based on an operational expression derived from the following physical model describing the behavior of the vehicle during running based on said roll angle:

$$J\phi''+D\phi'+K\phi=F$$

(where, J: roll inertia, D: damper constant, K: spring constant, F: centrifugal force, φ": roll rate differential value, φ': roll rate, φ: roll angle).

2. The vehicle behavior estimating method as recited in claim 1, wherein said operational expression is an expression for estimating the maximum amplitude of said roll angle so that an estimation value of the maximum amplitude of said roll angle is calculated based on said operation expression to set said estimation value as said overturn parameter.

3. The vehicle behavior estimating method as recited in claim 1, wherein said operational expression is an expression for estimating the behavior of said roll angle so that an estimation value of said roll angle after an elapse of predetermined time taking the delay of control in controlling the behavior of the vehicle into account is calculated based on said operational expression to set said estimation value as said overturn parameter.

4. The vehicle behavior estimating method as described in claim 1, characterized in that said operational expression is an expression for estimating the behavior of said roll angle and an estimation value of said roll angle when it becomes maximum in the next time is calculated based on said operational expression to set said estimation value as said overturn parameter.

5. A vehicle behavior estimating system for estimating an overturn parameter which represents readiness of overturn of a vehicle in running said vehicle, comprising:

vehicle state detecting means for measuring a roll angle and a roll rate of said vehicle; and
    overturn parameter estimating means for calculating an estimation value of said overturn parameter by using said roll angle and roll rate measured by said vehicle state detecting means based on an operational expression derived from the following physical model describing the behavior of the vehicle during running based on said roll angle:

$$J\phi''+D\phi'+K\phi=F$$

(where, J: roll inertia, D: damper constant, K: spring constant, F: centrifugal force, φ": roll rate differential value, φ': roll rate, φ: roll angle).

6. The vehicle behavior estimating system as recited in claim 5, wherein said operational expression is an expression for estimating the maximum amplitude of said roll angle so that said overturn parameter estimating means calculates an estimation value of the maximum amplitude of said roll angle based on said operation expression to set said estimation value as said overturn parameter.

7. The vehicle behavior estimating system as recited in claim 5, wherein said operational expression is an expression for estimating the behavior of said roll angle so that said overturn parameter estimating means calculates an estimation value of said roll angle after an elapse of predetermined time taking the delay of control in controlling the behavior of the vehicle into account based on said operational expression to set said estimation value as said overturn parameter.

8. The vehicle behavior estimating system as recited in claim 5, characterized in that said operational expression is an expression for estimating the behavior of said roll angle and said overturn parameter estimating means calculates an estimation value of said roll angle when it becomes maximum in the next time based on said operational expression to set said estimation value as said overturn parameter.

9. The vehicle behavior estimating system as recited in any one of claims 5 through 8, wherein said vehicle state detecting means comprises:

roll rate measuring means for measuring a roll rate of said vehicle; and roll angle calculating means for calculating said roll angle by using a physical model describing the relationship between said roll rate and said roll angle of vehicle based on said roll rate measured by said roll rate measuring means.

10. The vehicle behavior estimating system as recited in any one of claims 5 through 8, wherein said vehicle state detecting means comprises:

lateral acceleration measuring means for measuring lateral acceleration of said vehicle;

roll angle calculating means for calculating said roll angle by using a physical model describing the relationship between said lateral acceleration and said roll angle of vehicle based on said lateral acceleration measured by said lateral acceleration measuring means; and roll rate calculating means for calculating said roll rate of vehicle by differentiating said roll angle calculated by said roll angle calculating means.

11. The vehicle behavior estimating system as recited in any one of claims 5 through 8, wherein said vehicle state detecting means comprises:

yaw rate measuring means for measuring yaw rate of said vehicle;

body speed measuring means for measuring body speed of said vehicle;

roll angle calculating means for calculating said roll angle by using a physical model describing the relationship between said yaw rate and said roll angle of vehicle based on the result of measurement of said yaw rate and body speed; and roll rate calculating means for calculating said roll rate of vehicle by differentiating said roll angle calculated by said roll angle calculating means.

12. The vehicle behavior estimating system as recited in any one of claims 5 through 8, wherein said vehicle state detecting means comprises:

steering angle measuring means for measuring a steering angle of said vehicle;

body speed measuring means for measuring body speed of said vehicle;

roll angle calculating means for calculating said roll angle by using a physical model describing the relationship among said steering angle, said body speed and said roll angle of vehicle based on the result of measurement of said steering angle and body speed; and roll rate calculating means for calculating said roll rate of vehicle by differentiating said roll angle calculated by said roll angle calculating means.

13. The vehicle behavior estimating system as recited in any one of claims 5 through 8, wherein said vehicle state detecting means comprises:

wheel speed measuring means for measuring revolution speed of each wheel of said vehicle;

roll angle calculating means for calculating said roll angle by using a physical model describing the relationship between the difference of speeds of turning inner and outer wheels obtained by subtracting a sum of revolution speed of the front and rear wheels on the left side from a sum of revolution speed of front and rear wheels on the right side of said vehicle and the roll angle of said vehicle based on the revolution speed of each wheel measured by said wheel speed measuring means; and roll rate calculating means for calculating said roll rate of vehicle by differentiating said roll angle calculated by said roll angle calculating means.

14. A vehicle behavior controlling method having the step of estimating an overturn parameter which represents readiness of overturn of said vehicle during running by the vehicle behavior estimating method recited in any one of claims 1 through 4, further comprising steps of:

applying braking force to a predetermined wheel when said overturn parameter is greater than a predetermined value to prevent the overturn of said vehicle.

15. A vehicle behavior control system having the vehicle behavior estimating system as recited in any one of claims 5 through 13 for estimating an overturn parameter which represents readiness of overturn of said vehicle during running, further comprising;

control means for applying braking force to a predetermined wheel when said overturn parameter is greater than a predetermined value to prevent the overturn of said vehicle.

16. A body slip angle estimating method for a running vehicle comprising steps of:

measuring yaw rate $\Delta\theta$, lateral acceleration Gy and body speed Vb of said running vehicle;

calculating a body slip angular velocity estimation value $\Delta\beta H$ by using the following expression (where, $\Delta\theta$: yaw rate, Gy: lateral acceleration, Vb: body speed) based on the measured result and a delay element H3 set in advance to compensate measuring errors of said lateral acceleration:

$$\Delta\beta H = H3(\Delta\theta) - Gy/Vb,$$

and calculating a body slip angle estimation value $\beta H$ by integrating the body slip angular velocity estimation value $\Delta\beta H$.

17. The body slip angle estimating method as recited in claim 16, wherein an expression for calculating said body slip angular velocity estimation value $\Delta\beta H$ is what is led from a physical model describing the relationship between said yaw rate and a roll angle of the vehicle by using a secondary delay element H1 of said yaw rate and a physical model describing the relationship between said lateral acceleration and said roll angle by using a primary delay element H2 of said lateral acceleration, and said delay element H3 is a delay element represented by the following expression using said secondary delay element H1 and said primary delay element H2:

$$H3=H1/H2.$$

18. The body slip angle estimating method as recited in claim 16 or 17, wherein said lateral acceleration is measured by calculating said lateral acceleration by using the physical model describing the relationship between a roll rate and said lateral acceleration after measuring the roll rate of said vehicle and based on the result of said roll rate measurement.

19. A body slip angle estimating system for a running vehicle, comprising:
   yaw rate measuring means for measuring yaw rate $\Delta\theta$ of said running vehicle;
   lateral acceleration measuring means for measuring lateral acceleration of said vehicle;
   body speed measuring means for measuring body speed Vb of said vehicle;
   body slip angular velocity estimation value calculating means for calculating a body slip angular velocity estimation value $\Delta\beta H$ by using the following expression (where, $\Delta\theta$: yaw rate, Gy: lateral acceleration, Vb: body speed) based on the measured results of said yaw rate, lateral acceleration and body speed and a delay element H3 set in advance to compensate measuring errors of said lateral acceleration:

$$\Delta\beta H=H3(\Delta\theta)=Gy/Vb,$$

and
   body slip angle estimation value calculating means for calculating a body slip angle estimation value $\beta H$ by integrating the body slip angular velocity estimation value $\Delta\beta H$ calculated by said body slip angular velocity estimation value calculating means.

20. The body slip angle estimating system as recited in claim 19, wherein the expression for calculating said body slip angular velocity estimation value $\Delta\beta H$ is what is led from a physical model describing the relationship between said yaw rate and a roll angle of the vehicle by using a secondary delay element H1 of said yaw rate and a physical model describing the relationship between said lateral acceleration and said roll angle by using a primary delay element H2 of said lateral acceleration, and said delay element H3 is a delay element represented by the following expression using said secondary delay element H1 and said primary delay element H2:

$$H3=H1/H2.$$

21. The body slip angle estimating system as described in claim 19 or 20, wherein said lateral acceleration measuring means comprises roll rate measuring means for measuring a roll rate of said vehicle; and
   lateral acceleration calculating means for calculating said lateral acceleration by using the physical model describing the relationship between said roll rate and said lateral acceleration based on the roll rate measured by said roll rate measuring means.

* * * * *